United States Patent [19]
Hague et al.

[11] 3,844,028
[45] Oct. 29, 1974

[54] AUTOMATIC TOOL CHANGER

[75] Inventors: Robert Z. Hague, Oradell, N.J.; Edwin F. Hantman, New York, N.Y.; Howard H. Laucks, South Hackensack; George J. Loos, Parsippany, both of N.J.; Matthew F. Marsicano, Forest Hills, N.Y.; Alfred J. Mastropole, Saddle River, N.J.

[73] Assignee: Moog Inc., East Aurora, N.Y.

[22] Filed: May 2, 1969

[21] Appl. No.: 821,361

[52] U.S. Cl. .................................. 29/568, 90/11 A
[51] Int. Cl. .......................................... B23q 3/157
[58] Field of Search ............ 29/568, 26 A; 90/11 A

[56] References Cited
UNITED STATES PATENTS

| | | | |
|---|---|---|---|
| 2,860,547 | 11/1958 | Stephan | 90/11 A |
| 3,277,569 | 10/1966 | Verhoeven | 29/568 |
| 3,286,344 | 11/1966 | Brainard et al. | 29/568 |
| 3,312,370 | 4/1967 | Kolarich et al. | 29/568 X |
| 3,339,273 | 9/1967 | Knosp | 29/568 |
| 3,384,953 | 5/1968 | Schrolucke | 29/568 |
| 3,412,459 | 11/1968 | Hollis | 29/568 |
| 3,513,734 | 5/1970 | Bueroughs et al. | 29/568 X |
| 3,520,228 | 7/1970 | Wohlfeil | 29/568 X |
| 3,526,033 | 9/1970 | Saunders | 29/568 |
| 3,546,774 | 12/1970 | Stoferle et al. | 29/568 |
| 3,568,566 | 3/1971 | Weidig | 90/11 A |
| 3,587,359 | 6/1971 | McCash | 29/568 X |
| 3,589,164 | 6/1971 | Davern | 29/568 |
| 3,613,224 | 10/1971 | Newton et al. | 29/568 |

FOREIGN PATENTS OR APPLICATIONS

| | | | |
|---|---|---|---|
| 902,069 | 7/1962 | Great Britain | 29/26 A |

*Primary Examiner*—Andrew R. Juhasz
*Assistant Examiner*—Z. R. Bilinsky
*Attorney, Agent, or Firm*—Sommer & Sommer

[57] ABSTRACT

A tool changer is disclosed for automatically removing a working tool after having been used from the spindle of a machine tool such as a vertical milling machine, transferring the used working tool to a rack which stores a plurality of working tools, picking up from the rack another working tool for the next machining operation, transferring such new working tool to the spindle, and operatively mounting such new working tool on the spindle.

70 Claims, 75 Drawing Figures

PATENTED OCT 29 1974

3,844,028

INVENTORS
Robert Z. Hague
Edwin F. Hantman
Howard H. Laucks
George J. Loos
Matthew F. Marsicano
Alfred J. Mastropole BY Sommer & Weber
ATTORNEYS INVENTORS
Robert Z. Hague
Edwin F. Hantman
Howard H. Laucks
George J. Loos
Matthew F. Marsicano
Alfred J. Mastropole
BY Sommer & Weber
ATTORNEYS

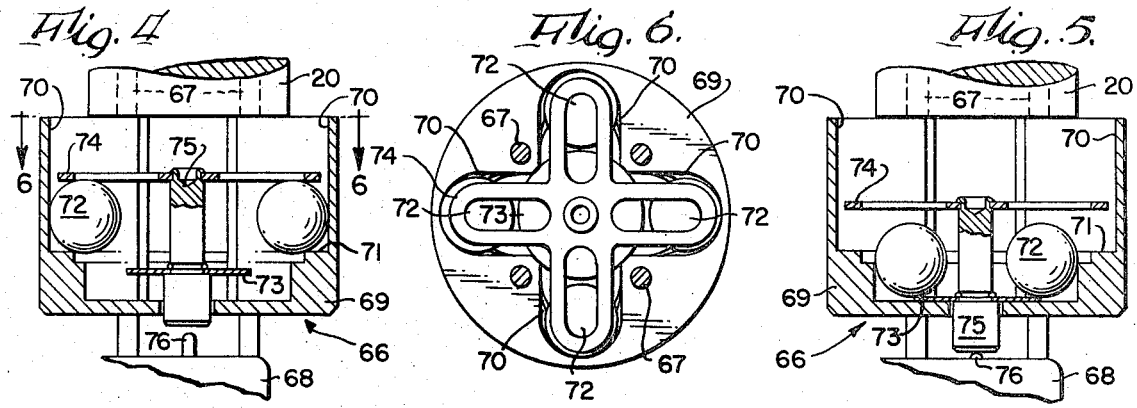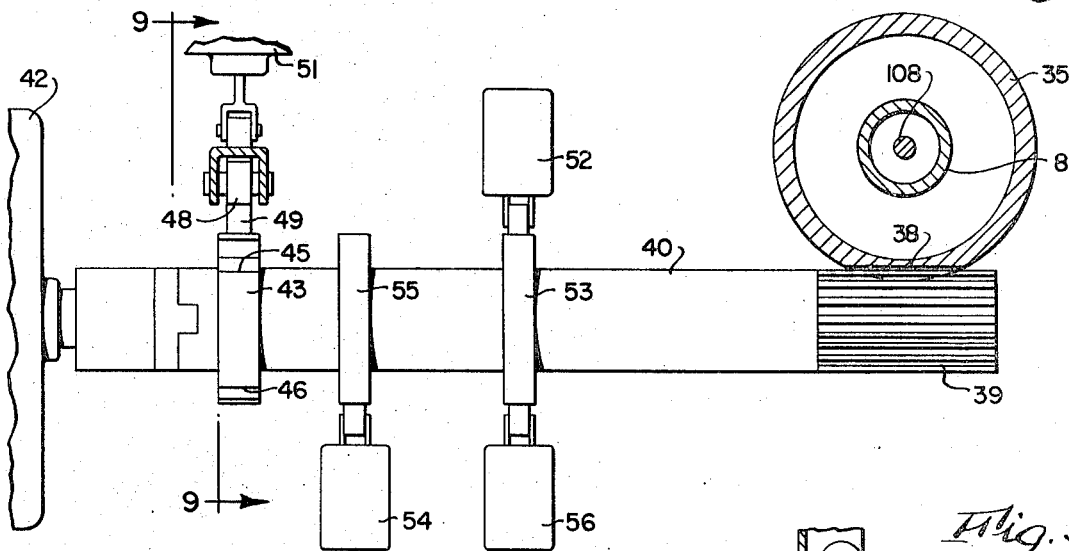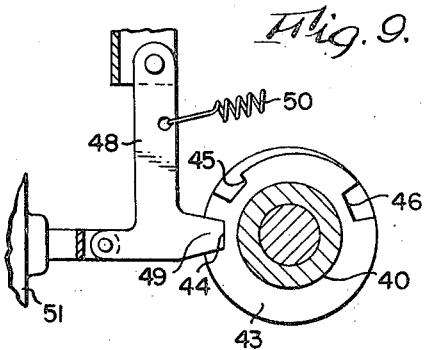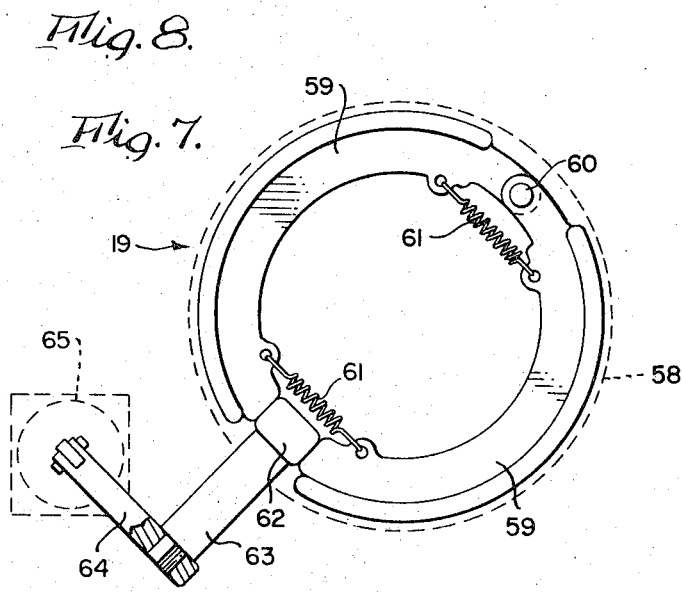

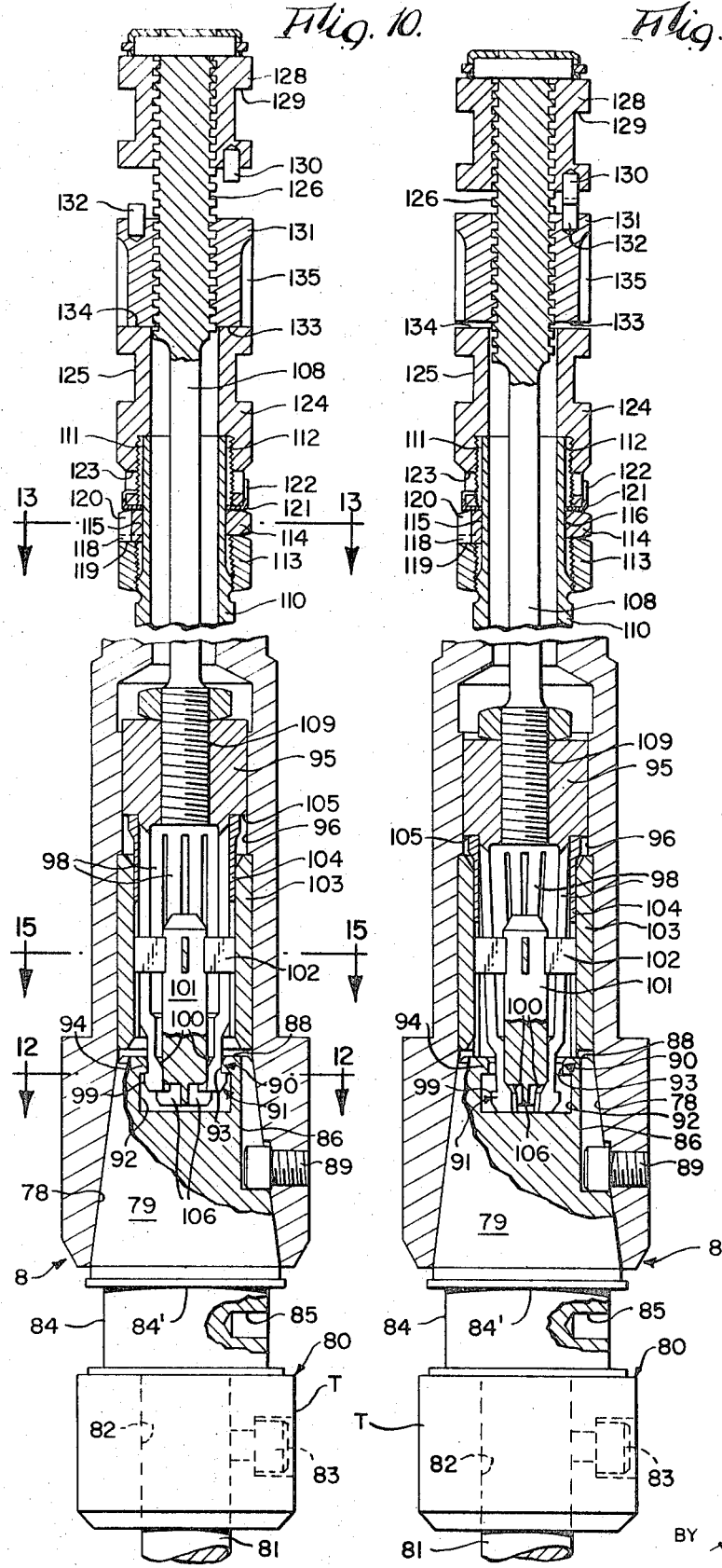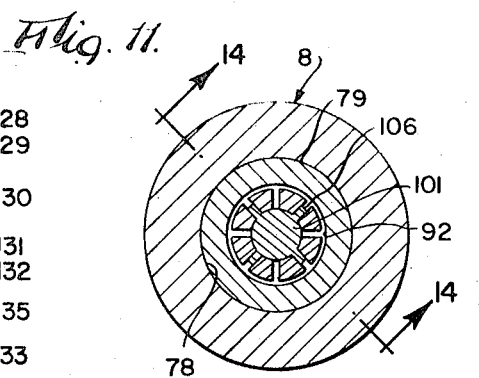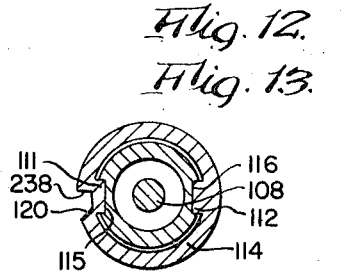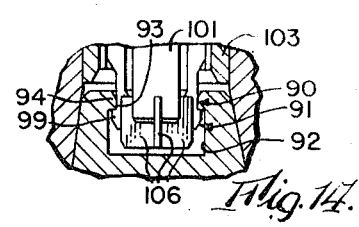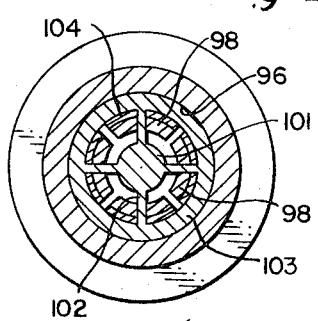

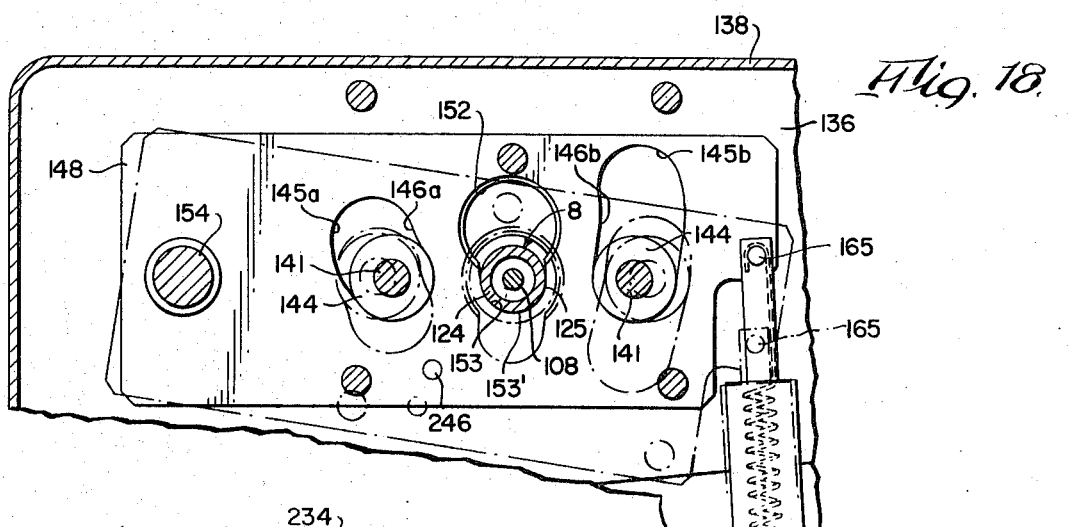
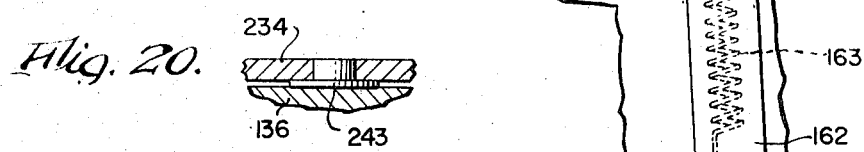
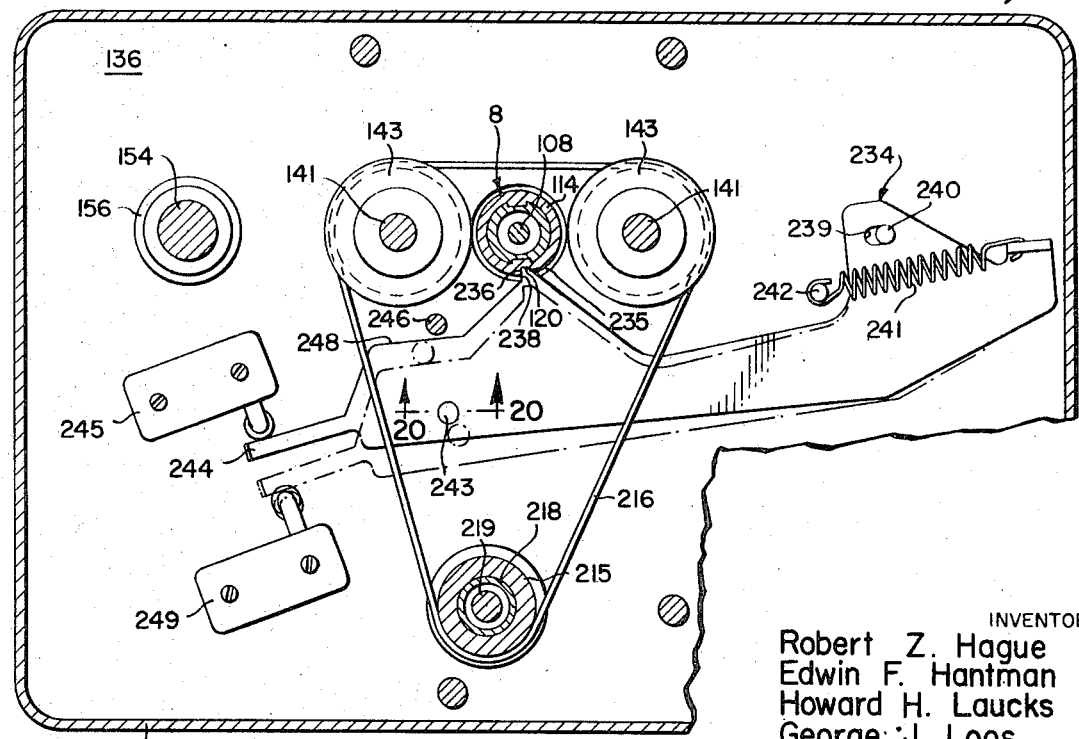
INVENTORS
Robert Z. Hague
Edwin F. Hantman
Howard H. Laucks
George J. Loos
Matthew F. Marsicano
Alfred J. Mastropole
BY *Sommer + Weber*
ATTORNEYS INVENTORS
Robert Z. Hague
Edwin F. Hantman
Howard H. Laucks
George J. Loos
Matthew F. Marsicano
Alfred J. Mastropole BY *Sommer & Weber*

ATTORNEYS

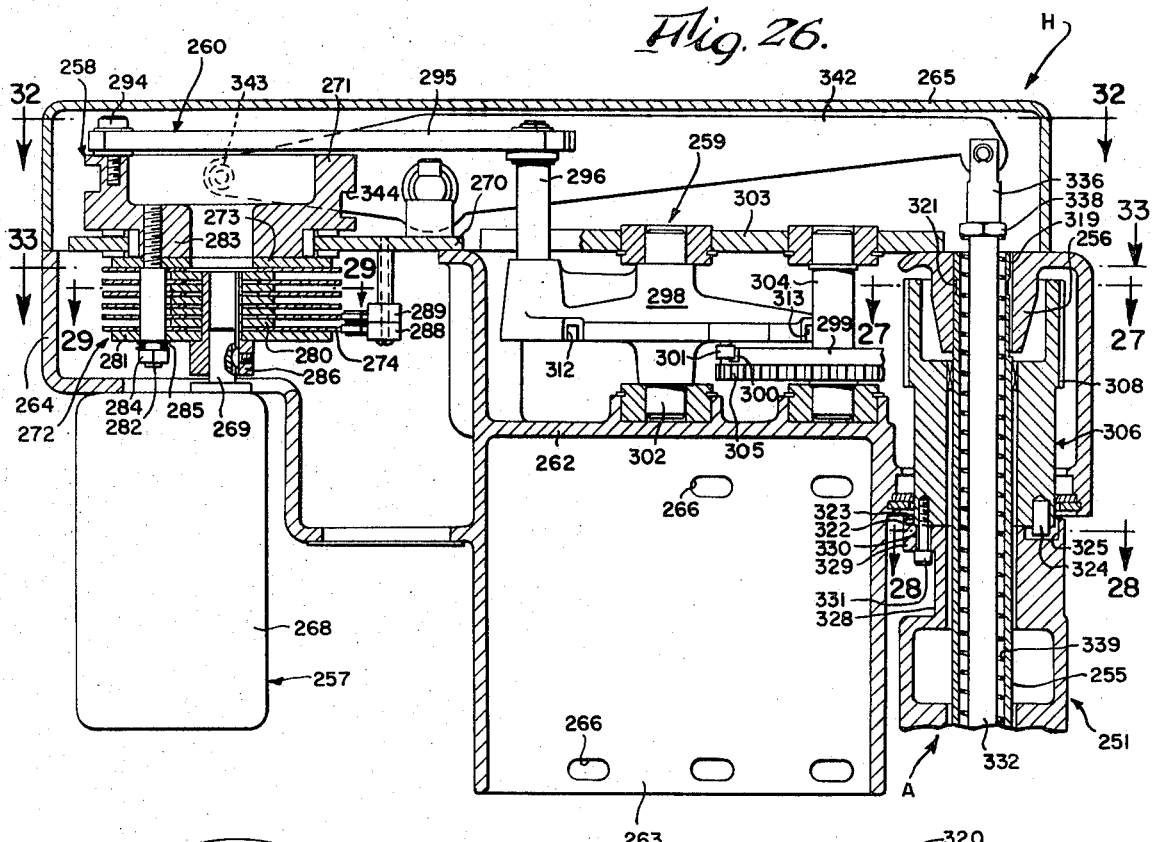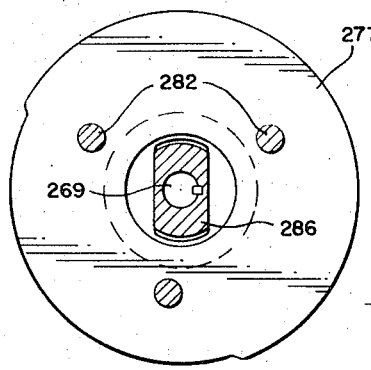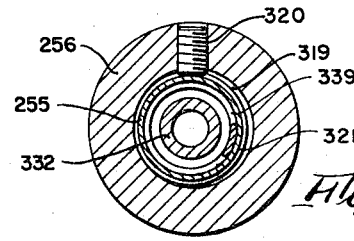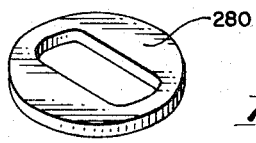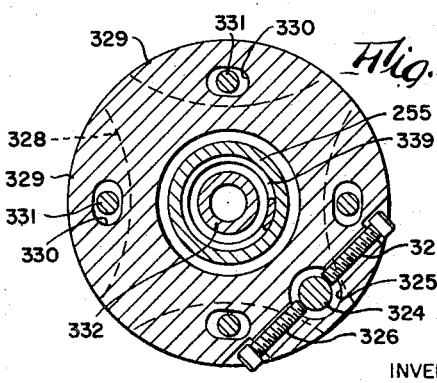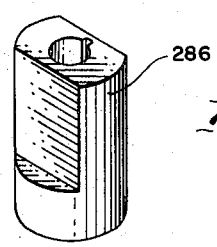

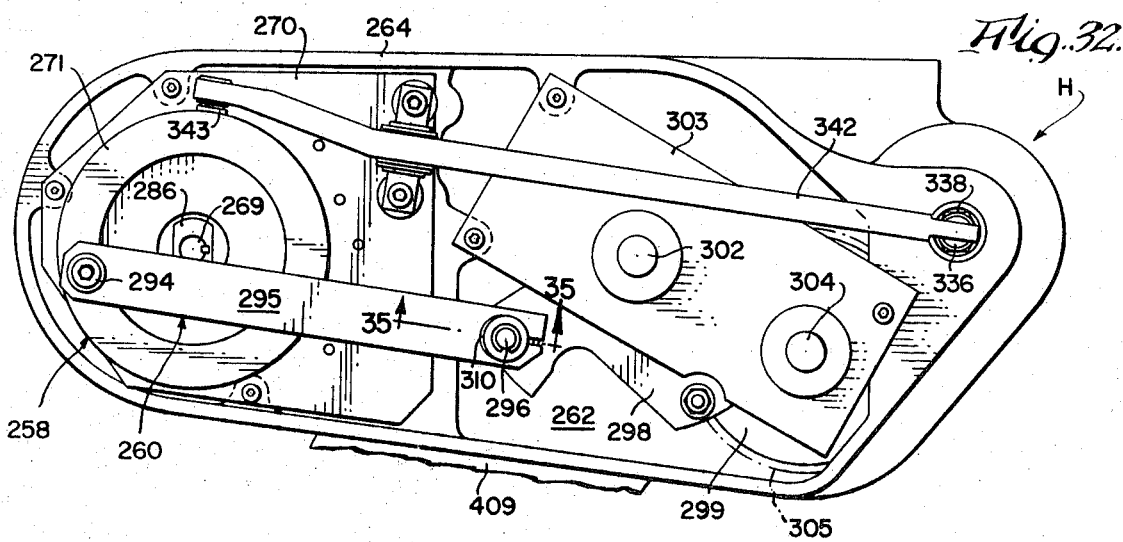
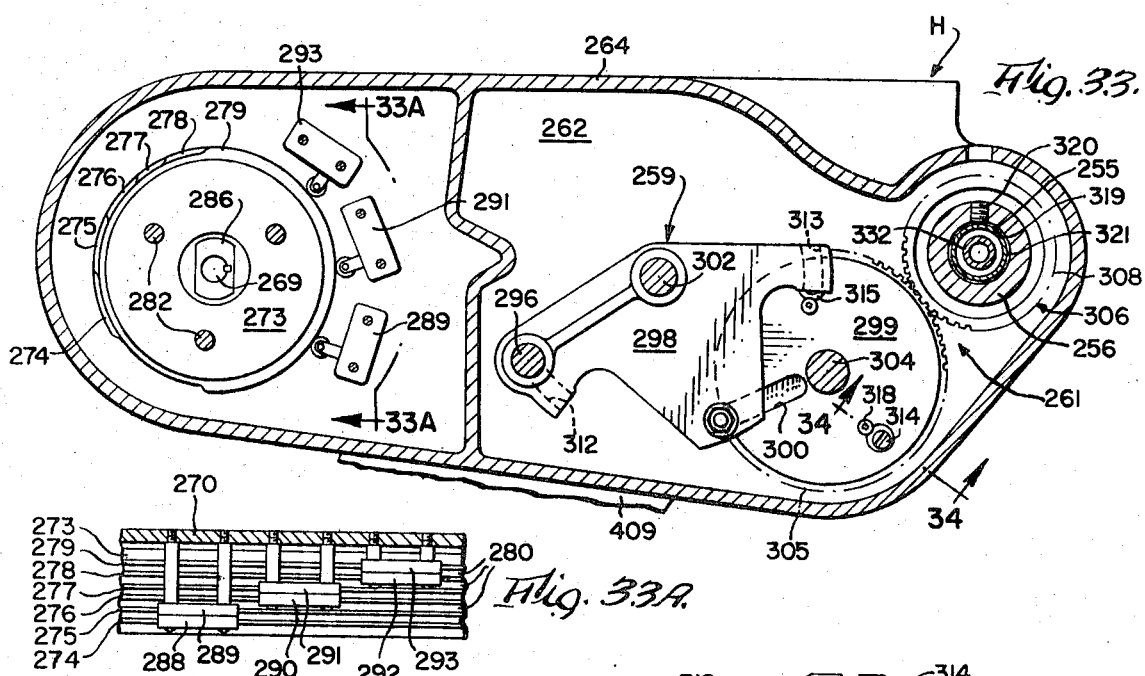
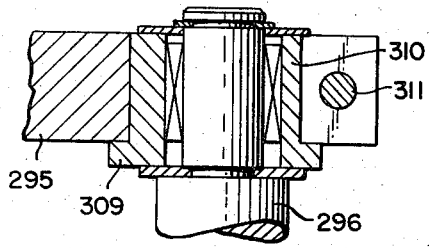
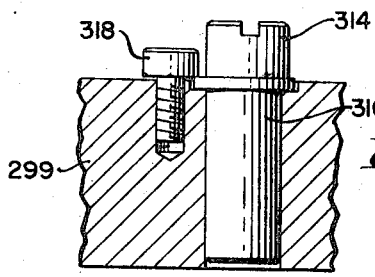
INVENTORS
Robert Z. Hague
Edwin F. Hantman
Howard H. Laucks
George J. Loos
Matthew F. Marsicano
Alfred J. Mastropole
BY Sommer + Weber
ATTORNEYS

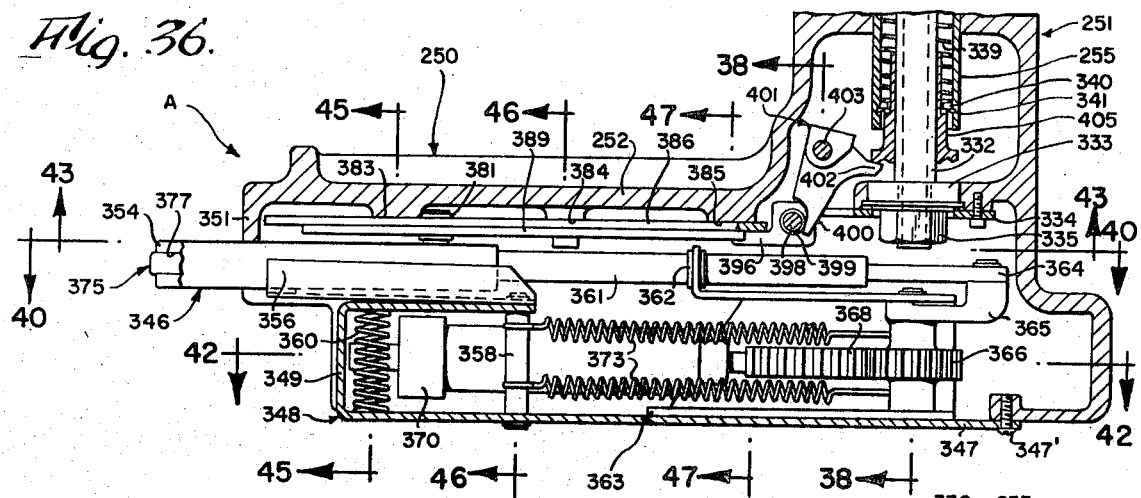
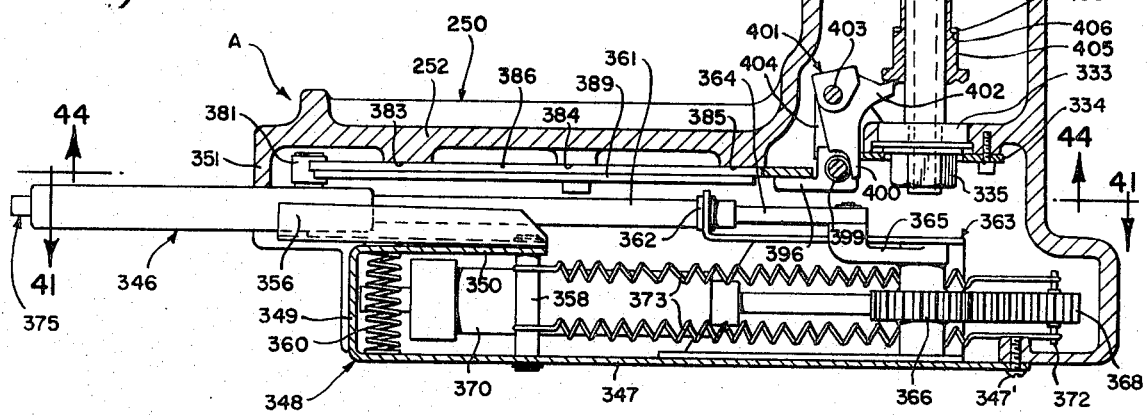
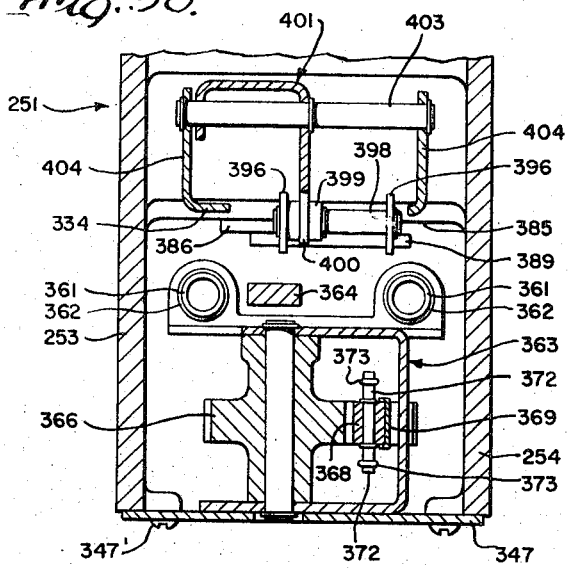

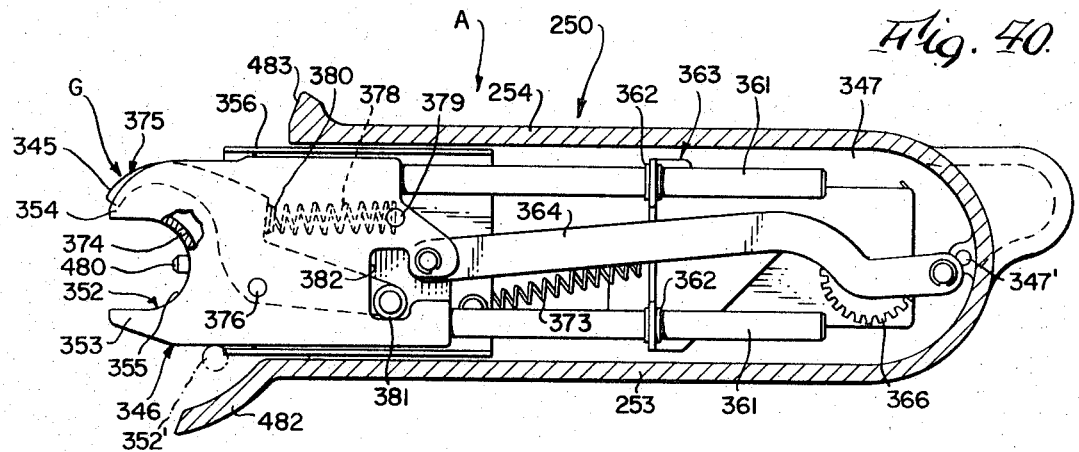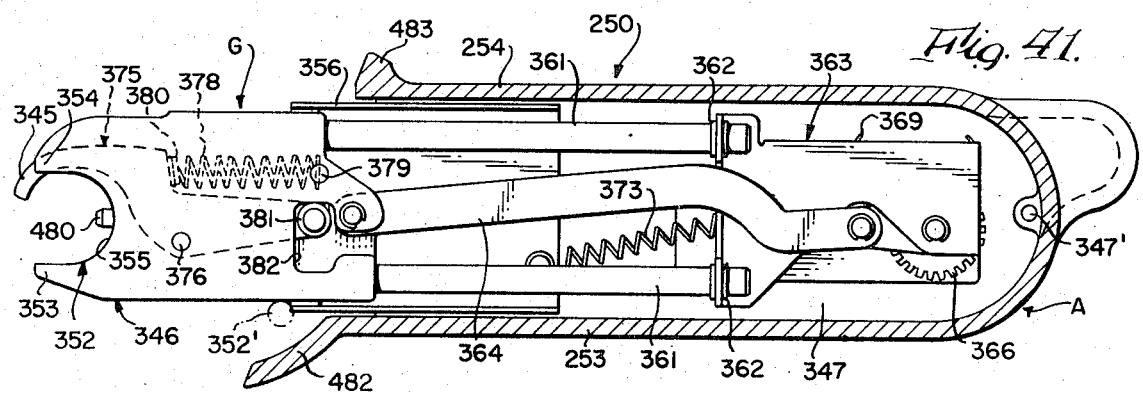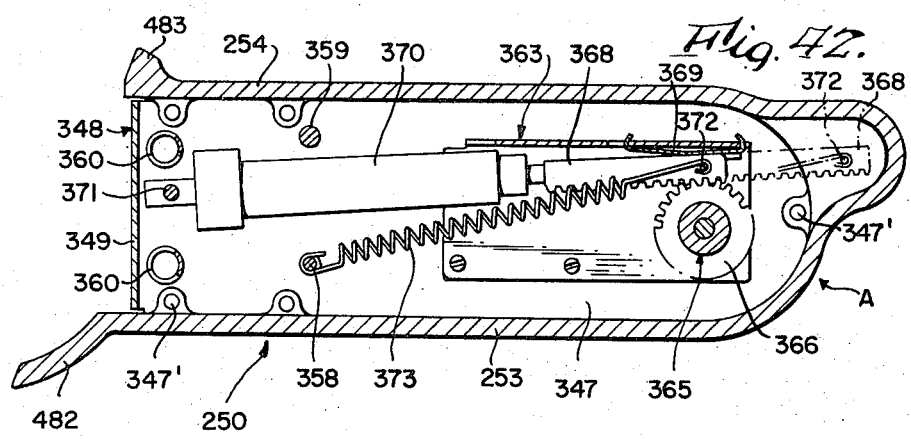

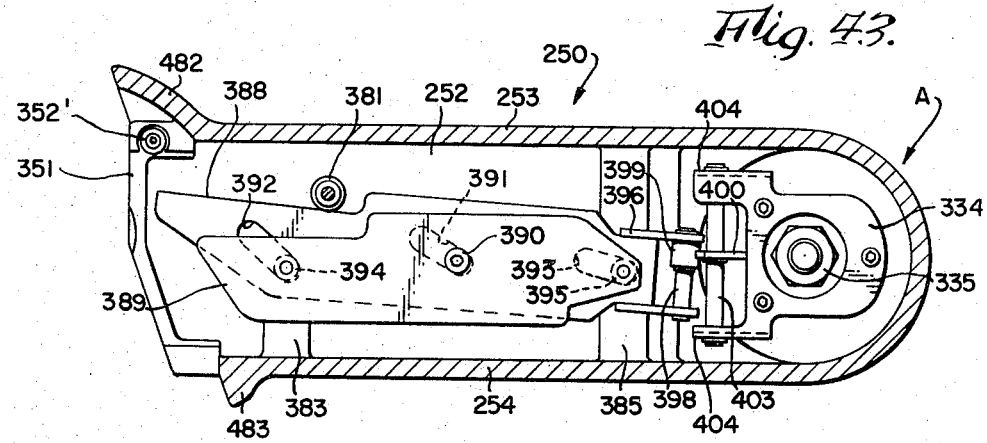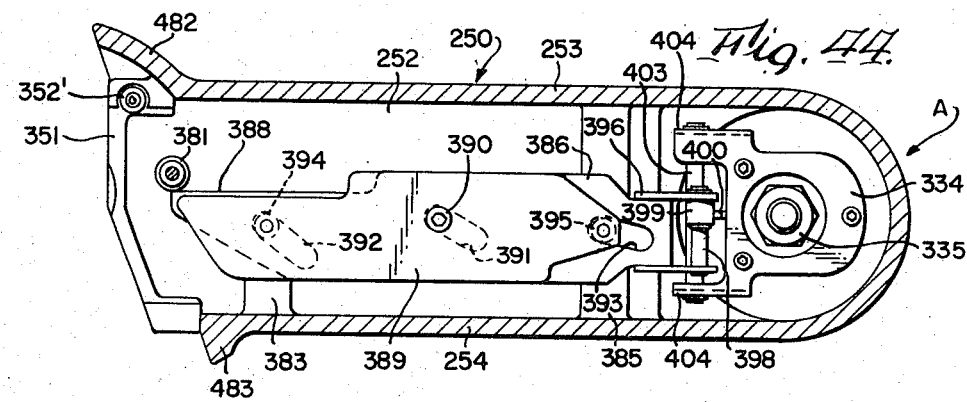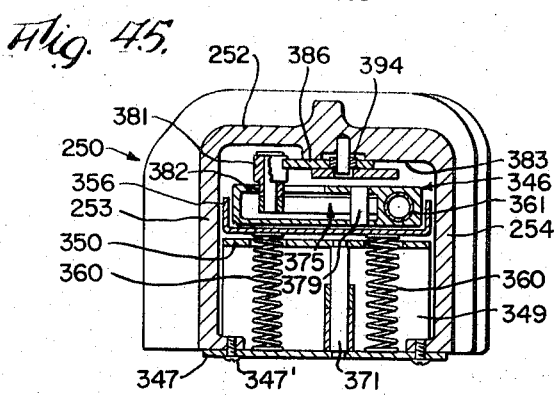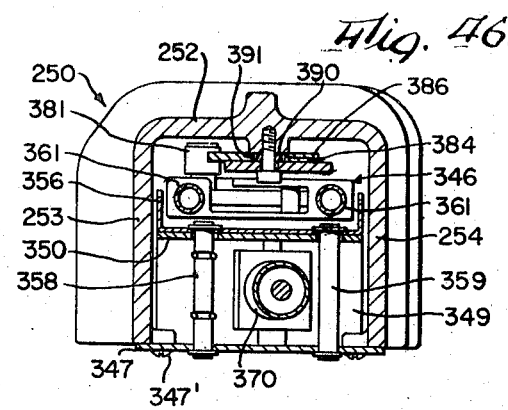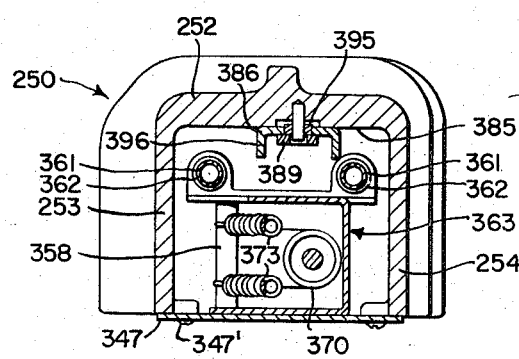

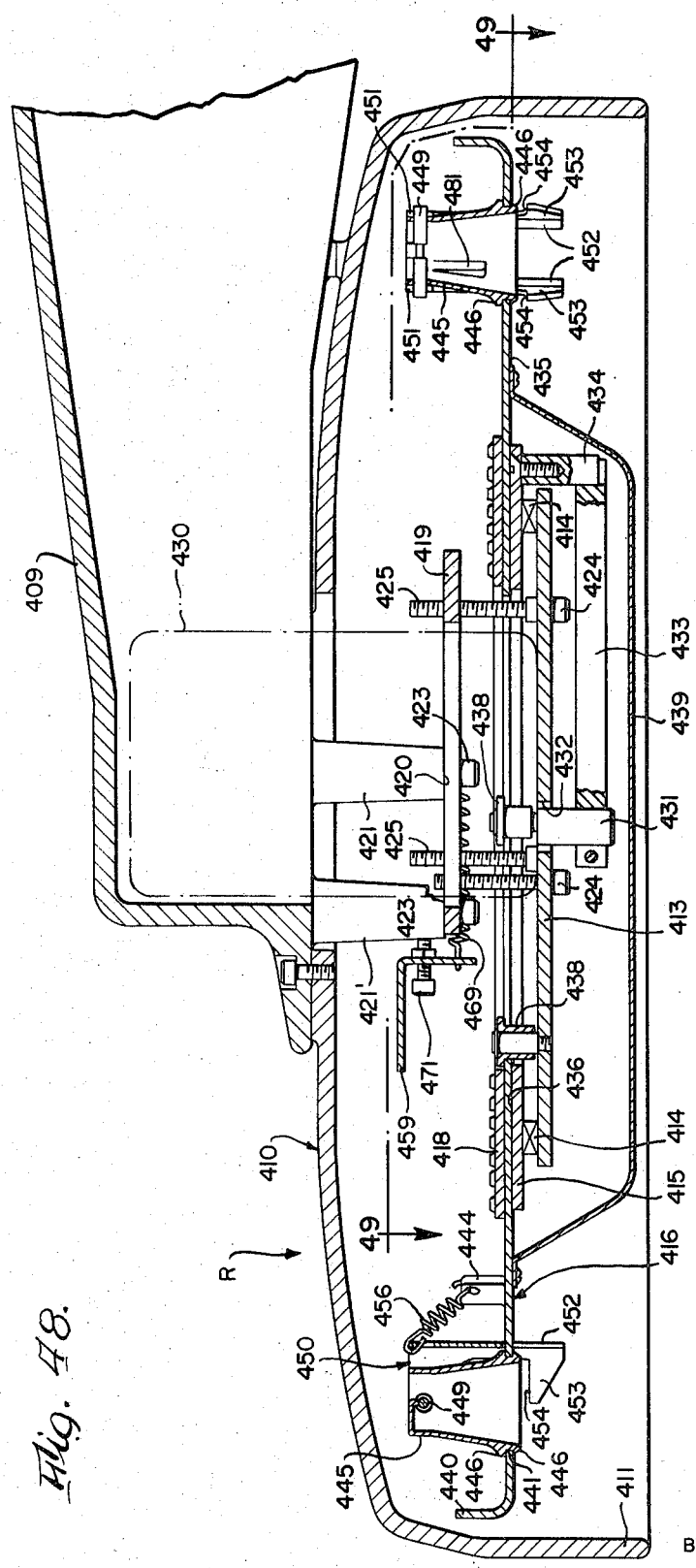

INVENTORS
Robert Z. Hague
Edwin F. Hantman
Howard H. Laucks
George J. Loos
Matthew F. Marsicano
Alfred J. Mastropole BY *Sommer & Weber*

ATTORNEYS

INVENTORS
Robert Z. Hague
Edwin F. Hantman
Howard H. Laucks
George J. Loos
Matthew F. Marsicano
Alfred J. Mastropole BY Sommer & Weber
ATTORNEYS

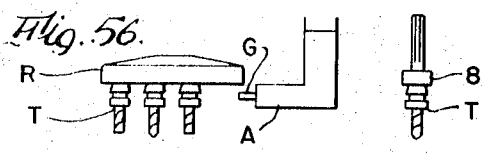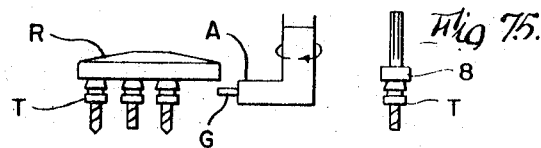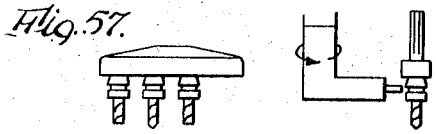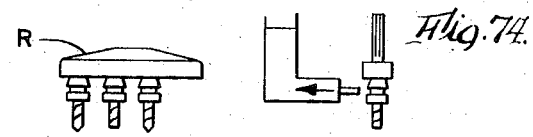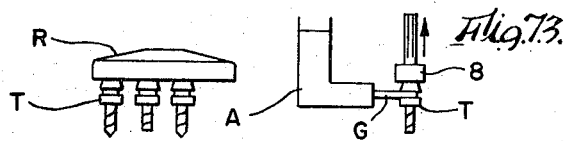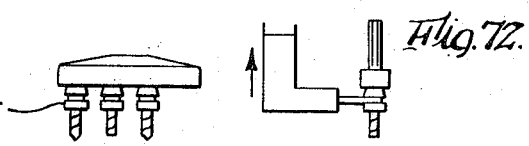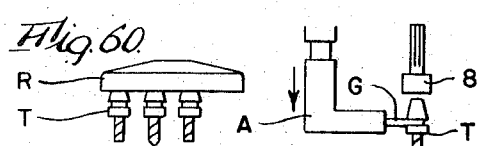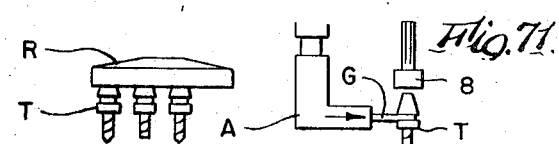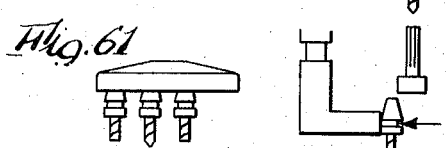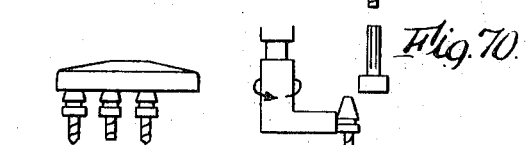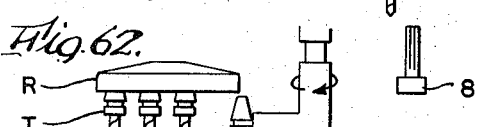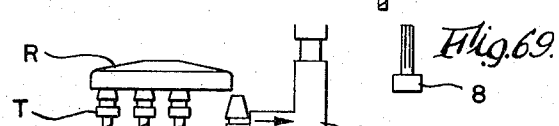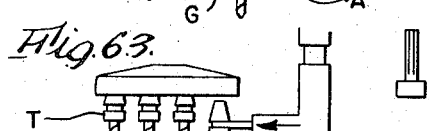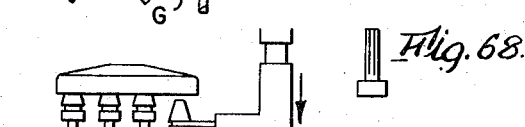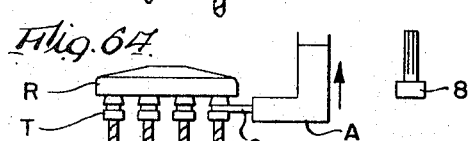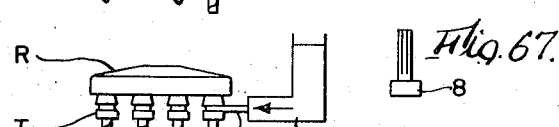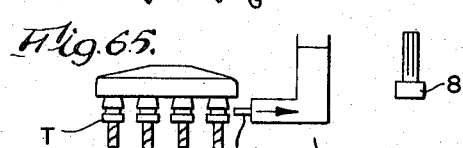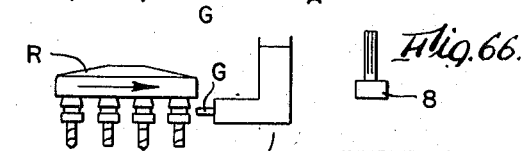
INVENTORS
Robert Z. Hague
Edwin F. Hantman
Howard H. Laucks
George J. Loos
Matthew F. Marsicano
Alfred J. Mastropole
BY *Sommer + Weber*
ATTORNEYS

# 3,844,028

AUTOMATIC TOOL CHANGER

BACKGROUND OF THE INVENTION

While machine tools equipped with automatic working tool changers are known, they suffer from such disadvantages as being complicated, bulky, interfering with the work site for a machining operation, slow, cumbersome, or are incorporated as an integral part of the machine tool itself so that the complete machine tool must be purchased to acquire the automatic tool changer feature and hence the cost is high.

SUMMARY OF THE INVENTION

The present invention relates to an improved tool changer for a machine tool having a spindle, which broadly comprises a tool rack having a plurality of stations for storing a plurality of working tools severally adapted for drive connection to the spindle, the rack being mounted for rotation about a fixed axis generally parallel to that of the spindle and radially spaced therefrom, a transfer arm mounted for pivotal movement about an axis generally parallel to the rack and spindle axes between a first angular position adjacent said rack and a second angular position adjacent said spindle and also mounted for translational movement axially of such axes, and an extendable and retractable working tool grasper arranged on the transfer arm.

The present invention overcomes the disadvantages of the prior art tool changers by providing automatic tool changing apparatus that: is more simple in construction and less expensive; is capable of adjustment for smooth and rapid operation; provides dependable service and is not likely to get out of order or require repairs; is compact and unobstructive when mounted on the machine tool with which it is associated; is adapted for retrofitting on suitable existing machine tools such as a vertical milling machine which is a type of machine tool commonly found in machine shops; and involves no mechanical interconnection as opposed to only related intelligence control between that portion of the apparatus which releasably holds a working tool on the spindle of the machine tool and that portion of the apparatus which transfers used and replacement working tools between the spindle and a tool storage site.

One of the outstanding advantages of the inventive tool changer is that a rotary device controls the timing of the drive for various functions performed during a tool change.

Another important advantage of the inventive tool changer, contributing materially to its comparative simplicity and inexpensiveness, is that its cycle of operation is programmed so that one part of the cycle is performed by rotation of the aforementioned rotary device in one direction and another part of the cycle is performed by reversing the direction of rotation of such device, thereby reducing the amount of mechanism required.

Other advantages will be apparent from the details of the preferred embodiment of the invention illustrated in the accompanying drawings and hereinafter described.

BRIEF DESCRIPTION OF THE DRAWING

FIG. 4 is a fragmentary enlarged vertical central sectional view through the centrifugal device arranged on the lower end of the main drive motor shaft shown in FIG. 3, illustrating an above-critical speed condition of the device.

FIG. 5 is a view similar to FIg. 4 illustrating a below-critical speed condition of the device.

FIG. 6 is a horizontal sectional view thereof taken on line 6—6, FIG. 4.

FIG. 7 is a fragmentary enlarged horizontal sectional view of the power driven spindle brake assembly, taken generally on line 7—7, FIG. 3.

FIG. 8 is a fragmentary enlarged horizontal sectional view of the power driven shifter mechanism for the back gear assembly shown in FIG. 3, this view being taken on line 8—8 thereof.

FIG. 9 is a fragmentary vertical transverse sectional view thereof taken on line 9—9, FIG. 8.

FIG. 10 is a fragmentary enlarged vertical central sectional view of the machine spindle assembly, with a central portion being broken away, taken generally on line 10—10 of FIG. 3 and illustrated in a spindle-tool-connected condition.

FIG. 11 is a view similar to FIG. 10 illustrating a spindle-tool-disconnected condition.

FIG. 12 is a horizontal sectional view of the spindle assembly taken on line 12—12, FIG. 10.

FIG. 13 is a horizontal sectional view thereof taken on line 13—13, FIG. 10.

FIG. 14 is a fragmentary vertical sectional view thereof taken on line 14—14, FIG. 12.

FIG. 15 is a horizontal sectional view thereof taken on line 15—15, FIG. 10.

FIG. 18 is a similar fragmentary horizontal sectional view thereof but taken on a still lower plane indicated by line 18—18, FIG. 1.

FIG. 19 is another fragmentary horizontal sectional view thereof taken on yet another lower plane indicated by line 19—19, FIG. 1.

FIG. 20 is a fragmentary enlarged vertical sectional view of a spindle pawl member shown in FIG. 19, being taken on line 20—20 of that figure, and showing in elevation a glide button for supporting such member.

FIG. 26 is a fragmentary greatly enlarged vertical sectional view of a gear housing and showing mechanism contained therein partly in elevation and partly in section, this view being taken generally on line 26—26 of FIG. 2.

FIG. 27 is an enlarged horizontal sectional view thereof taken on line 27—27, FIG. 26.

FIG. 28 is an enlarged horizontal sectional view of the upper section of the tool transfer arm connected to mechanism in the gear housing, this view being taken on line 28—28 of FIG. 26.

FIG. 29 is an enlarged horizontal sectional view of another part of the mechanism contained in the gear housing, this view being taken on line 29—29 of FIG. 26.

FIG. 30 is an enlarged perspective view of a clutch disc included in mechanism contained in the gear housing and cross-sectionally illustrated in FIG. 26.

FIG. 31 is a perspective view of the drive member for the aforementioned clutch disc.

FIG. 32 is a horizontal sectional view of the gear housing showing the internal mechanism in elevation, taken generally on line 32—32 of FIG. 26.

FIG. 33 is another horizontal sectional view thereof and the mechanism arranged therein, taken at a lower elevation on line 33—33 of FIG. 26.

FIG. 33A is a vertical sectional view thereof taken on line 33A—33A, FIG. 33.

FIG. 34 is a fragmentary greatly enlarged vertical sectional view thereof showing in elevation an eccentric locking pin forming pat of the driven member of geneva motion mechanism illustrated in FIG. 33, this view being taken on line 34—34 thereof.

FIG. 35 is a fragmentary greatly enlarged vertical sectional view through the connection of a link to the drive member of the aforementioned geneva mechanism shown in FIG. 32, this view being taken on line 35—35 thereof.

FIG. 36 is a vertical longitudinal sectional view of the lower horizontal section of the tool transfer arm and showing mostly in elevation tool grasping mechanism arranged therein, this view being taken on line 36—36 of FIG. 2 and on a greatly enlarged scale with respect thereto and illustrating a raised condition of the arm and a retracted condition of the grasping mechanism.

FIG. 37 is a view similar to FIG. 36 but illustrating the tool transfer arm in a lowered condition and an extended condition of the tool grasping mechanism.

FIG. 38 is a fragmentary enlarged vertical transverse sectinal view thereof taken generally on line 38—38, FIG. 36.

FIG. 39 is a fragmentary enlarged sectional view of the lower portion of the tubular pivot on which the tool transfer arm is mounted and associated elements, and illustrating another condition of these elements as compared to their condition illustrated in FIG. 36.

FIG. 40 is a horizontal sectional view of the transfer arm and a top plan view of the grasping mechanism arranged therein, taken on line 40—40 of FIG. 36.

FIG. 41 is a similar view but taken on line 41—41, FIG. 37.

FIG. 42 is a horizontal sectional view thereof taken at a lower elevation indicated by line 42—42, FIG. 36.

FIG. 43 is a horizontal upwardly directed sectional view of the transfer arm and actuating mechanism arranged therein for a movable finger of the tool grasper and illustrating a finger-open activated condition thereof, this view being taken on line 43—43, FIG. 36.

FIG. 44 is a similar view but illustrating a finger-closed inactivated condition of the actuating mechanism and taken on line 44—44, FIG. 37.

FIG. 45 is a vertical transverse sectional view thereof taken on line 45—45, FIG. 36.

FIG. 46 is a vertical transverse sectional view thereof taken generally on line 46—46, FIG. 36.

FIG. 47 is still another vertical transverse sectional view thereof taken on line 47—47, FIG. 36.

FIG. 48 is a greatly enlarged vertical central sectional view of a tool rack assembly and its associated support structure illustrated fragmentarily, this view being taken on line 48—48 of FIG. 2.

FIGS. 56 through 75 show progressively a sequence of events which occur during one complete operation of the tool change cycle with the transfer arm starting in a park condition at the tool rack and returning to such park condition, the sequence being indicated in the order of increasing numbers of the figures.

DESCRIPTION OF THE PREFERRED EMBODIMENT

Figure 1:
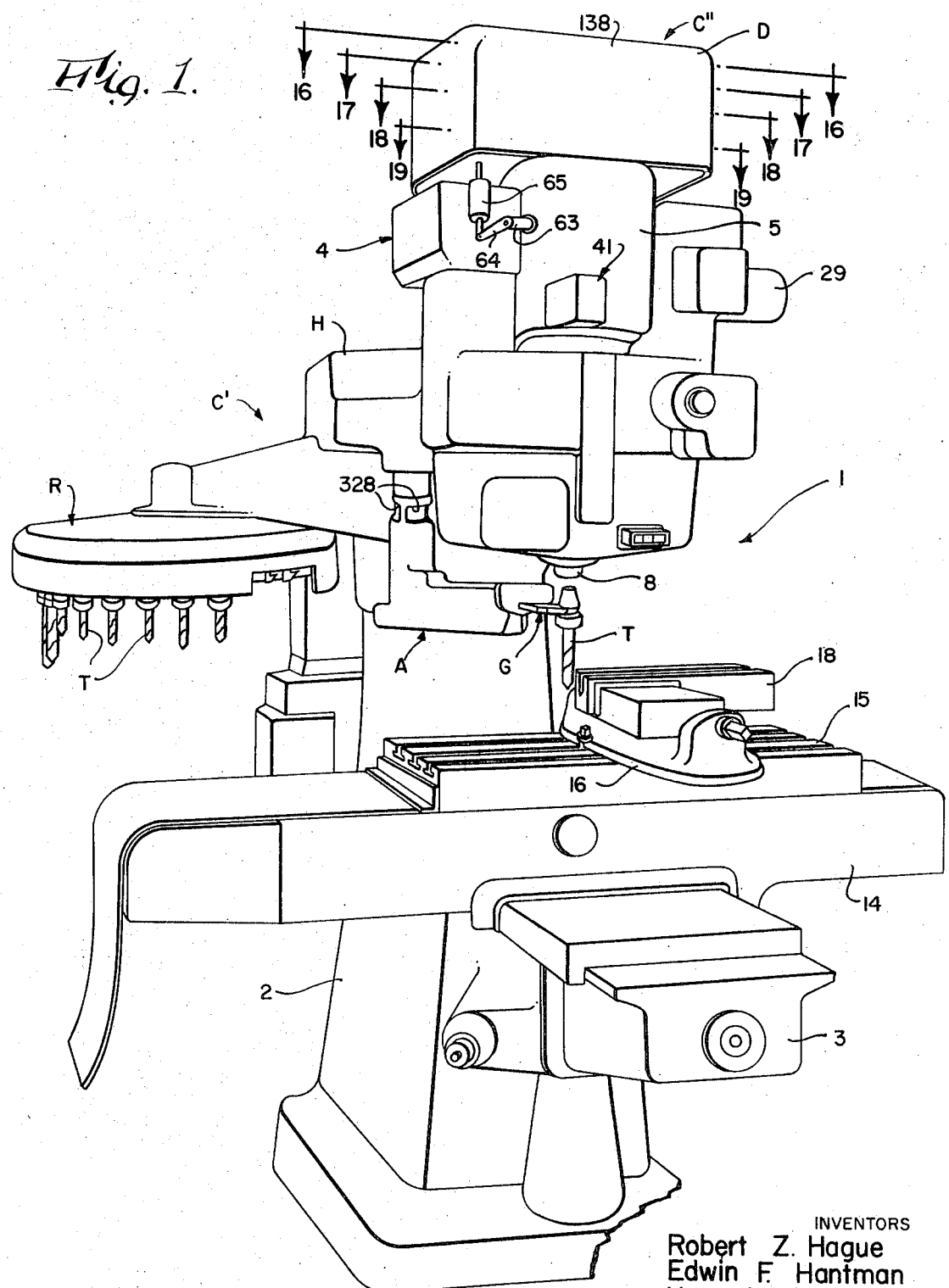
FIG. 1 is a perspective view of a vertical spindle milling machine embodying the present invention, viewed from the front and slightly to the left thereof.

General Description of Illustrated Machine Tool Suitable for Installation of Inventive Working Tool Changer The numeral 1 represents generally a machine tool of any suitable type, illustrated specifically as a vertical milling machine, and is shown in FIG. 1 as including a pedestal 2 from which a knee 3 extends forwardly, and a head structure 4 which overhangs the knee and includes a housing 5. A quill 6 is suitably supported on housing 5 of head structure 4 for vertical but non-rotative movement. This quill suitably supports a vertically disposed spindle 8 which is constrained to move vertically with the quill but is free to rotate relative thereto. The lower end of spindle 8 is shown in FIG. 1 as exposed from head structure 4 and is adapted to be drivingly connected as wiell be described infra to any one of a plurality of working tools, herein individually represented generally by T.

Spindle 8 is suitably driven at a selectively variable rotational speed by an electric drive motor 9 through an adjustable belt and pulley assembly 10 and a shiftable back gear assembly 11.

Figure 3:
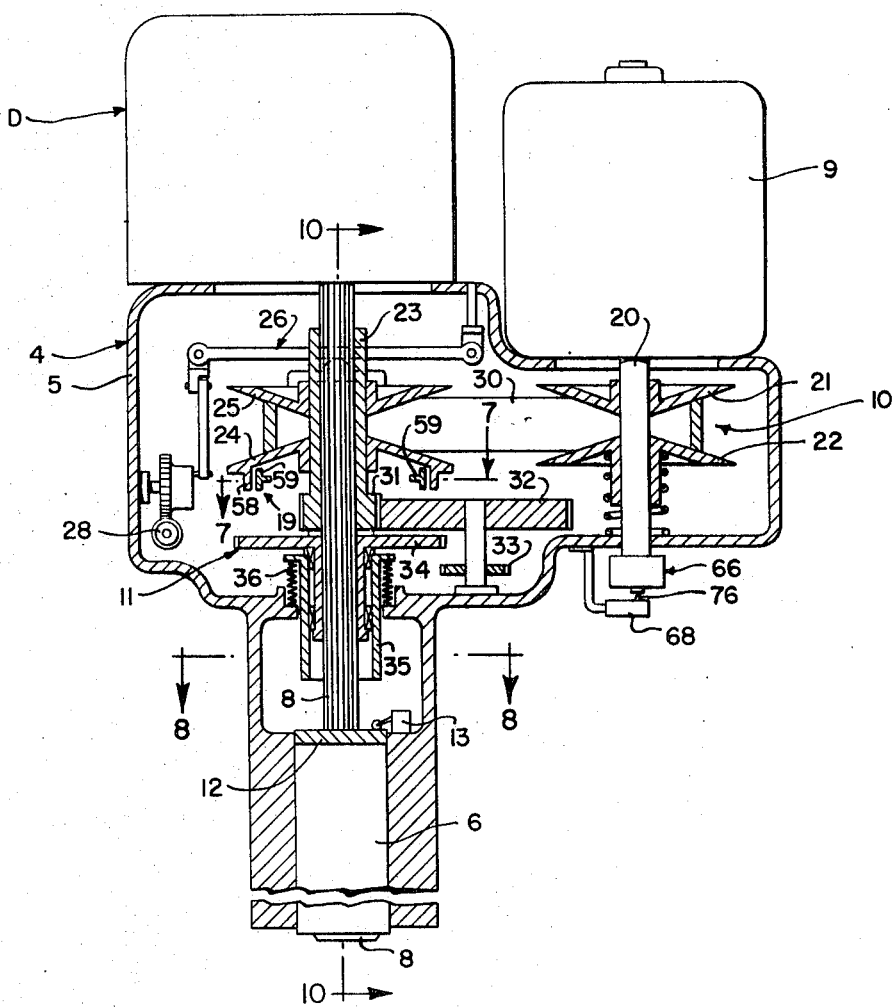
FIG. 3 is a fragmentary enlarged vertical sectional view thereof taken on line 3—3, FIG. 2.
Figure 2:
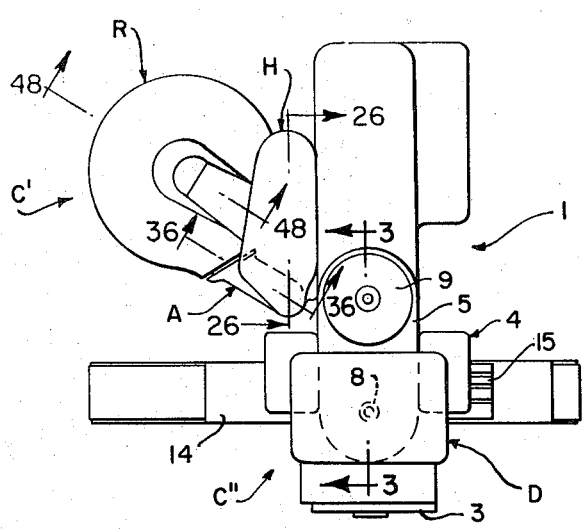
FIG. 2 is a reduced top plan view of the machine tool shown in FIG. 1.
Figure 16:
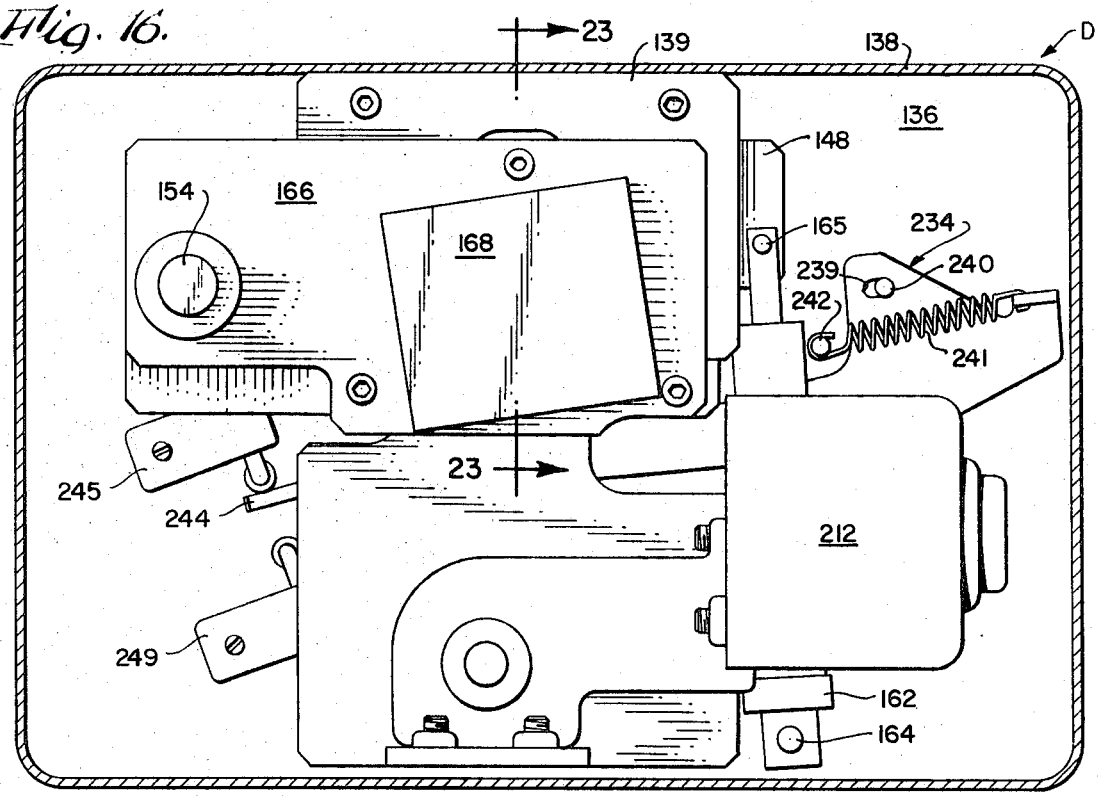
FIG. 16 is an enlarged horizontal sectional view of the drawbar operating mechanism taken on a plane indicated by line 16—16, FIG. 1.
Figure 17:
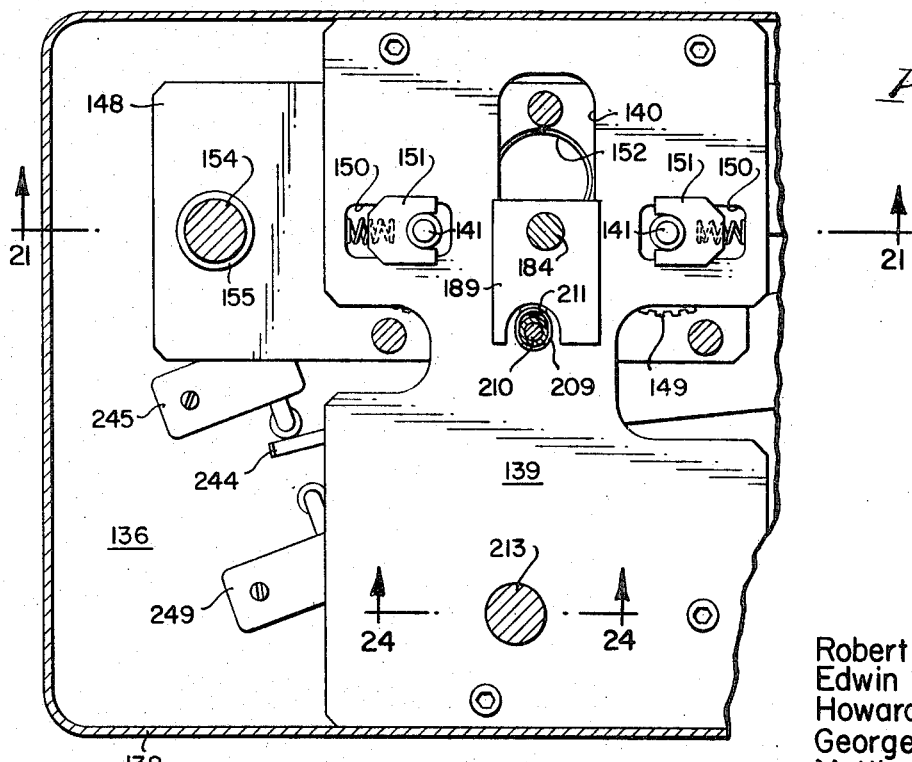
FIG. 17 is a fragmentary horizontal sectional view thereof on the same scale as FIG. 16 but taken on a lower plane indicated by line 17—17, FIG. 1.

The vertical axis along which quill 6 along with spindle 8 are movable is regarded as the Z—Z axis. The means for so vertically moving the quill and spindle form no part of the present invention and may be of any suitable construction. However, it is preferred to use the hydraulic means disclosed in U.S. Pat. No. 3,420,141. With an arrangement such as disclosed in such patent, the quill and spindle are caused to move vertically by hydraulic drive on a cross bar suggested at 12 in FIG. 3. For a purpose to be explained infra, the uppermost position of quill 6 is shown in FIG. 3 as detected by a microswitch 13, although in the hydraulic means disclosed in the aforementioned patent, such position of the quill is detected by a null detector or pressure switch.

Knee 3 of the machine tool slidingly supports a saddle 14 for horizontal movement fore and aft of the machine in a direction regarded as the Y—Y axis. A table 15 is slidably supported on the saddle for horizontal movement transversely thereof in a direction regarded as the X—X axis which extends crosswise of the machine. Table 15 is shown in FIG. 1 as mounting a fixture 16 to which a workpiece 18 is suitably secured and on which a sequence of specifically different machining operations are performed by various of the working tools T used successively.

In an automated control system the table and saddle and hence the workpiece are moved to the desired coordinate location along the X—X and Y—Y axes by numerical control positioners. While such positioners form no part of the present invention and may be of any suitable type, it is preferred to employ the hydraulic type positioners disclosed in U.S. Pat Nos. 3,174,406; 3,198,084 and 3,405,600. Said patent 3,198,084 is of particular interest because it discloses manual or tape control modes for the positioners and also discloses a pneumatic type tape reader. It is preferred to use tape control commands to the inventive tool changer for the selection of a working tool T as will be described infra.

Adverting again to spindle 8, rotation of the same can be stopped by a brake assembly 19 upon deenergizing motor 9. This assembly as well as assemblies 10 and 11 in the illustrated type of machine tool are well known to those skilled in the art and therefore normally would not require description herein. However, inasmuch as heretofore such assemblies severally were manually adjustable but are now to be automatically controlled in keeping with the present inventive concept, it has been deemed desirable to illustrate each assembly schematically and briefly describe the same along with the power drive additions.

However, before doing so, it is pointed out that besides these power drive modifications of the machine tool it is only necessary to mount two main components C' and C" on the frame of the machine in order to provide the tool changer of the present invention. Component C' is a single unit comprising a tool rack R, a tool transfer arm A, a tool grasper G and a gear housing H, and contains the mechanism for rotating rack R, for swinging arm A between an angular position adjacent rack R and another position adjacent spindle 8 and for raising and lowering this arm. Component C' is shown as mounted on pedestal 2. The other component C" is also a single unit and compreses a drawbar operating mechanism D which is shown as suitably mounted on the head structure 4 of the machine and is intended to be operatively associated with spindle 8 for connecting and disconnecting a tool T thereto.

Belt and Pulley Assembly With Power Driven Adjustor

This assembly 10 comprises a drive pulley fast to a vertically disposed drive shaft 20 of motor 9, this pulley including an upper fixed side 21 and an upwardly biased lower movable side 22. A driven pulley is fast to a sleeve 23 rotatably mounted on spindle 8 and includes a vertically fixed lower side 24 and a vertically movable upper side 25. Vertical movement of side 25 is controlled by a lever, link and crank mechanism indicated collectively at 26 which includes a control shaft 28 driven by an electric motor 29 arranged exteriorly of housing 5 as shown in FIG. 1. A belt 30 passes around the pulleys. As is known, the relative spacing between the corresponding pairs of fixed and movable pulley sides varies the effective radii of the drive and driven pulleys for the belt. In this manner the spindle drive is variable.

Back Gear Assembly With Power Driven Shifter

This assembly 11 includes a high-low gear train operatively interposed between driven sleeve 23 and spindle 8. This gear train comprises an upper gear 31 fast to the lower end of sleeve 23 and constantly meshing with a larger gear 32 fast to the upper end of a countershaft, to the lower end of which is fast a smaller gear 33, and a vertically shiftable back gear 34. This back gear has its bearings mounted in a tubular support member 35 which is biased upwardly constantly by a plurality of springs 36 interposed between this member and housing 5. As shown, back gear 34 is in its high position wherein axially facing dogs on its upper face mesh with downwardly facing dogs on the lower end of upper gear 31 so as to couple drivingly sleeve 23 to back gear 34, the latter in turn being splined to spindle 8.

The low gear position is provided when back gear 34 is moved to a downward position in which its peripheral teeth mesh with gear 33. Intermediate these two extreme vertical positions is a middle position considered neutral in which neither the peripheral teeth on the back gear nor the end face dogs mesh with other gear elements.

Power driven means are provided for shifting back gear 34 between its three possible positions, high, neutral and low. As shown in FIG. 8, member 35 has rack teeth 38 formed on one side thereof which mesh with gear teeth 39 on a horizontal shaft 40 which extends through housing 5 to the exterior thereof. The shifter mechanism operatively associated with shaft 40 is represented generally by the numeral 41 in FIG. 1.

The outer end of shaft 40 is drivingly coupled through a suitable one-way clutch to an electric motor 42 which when energized is adapted to rotate this shaft in a counterclockwise direction as viewed in FIG. 9. Fast to this shaft is a collar 43 having three pawl recesses 44, 45 and 46 circumferentially spaced from one another and corresponding to high, neutral and low back gear positions, respectively. Pivotally supported in any suitable manner adjacent collar 43 is a pawl 48 having a tooth 49 urged by a spring 50 toward this collar, this tooth being shown received in recess 44. This pawl is adapted to be pulled away from the collar by energization of a solenoid 51.

When it is desired to shift member 35 downwardly to place back gear in a neutral position, solenoid 51 is energized so as to retract pawl 48 from recess 44, following which motor 42 is energized to rotate shaft 40 thereby moving high pawl recess 44 away from the pawl tooth and moving the neutral pawl recess 45 toward the pawl tooth. When pawl tooth 49 and recess 45 are opposite each other, as detected by a microswitch 52 operatively associated with a cam 53 fast to shaft 40, motor 42 will be deenergized, as will also be the solenoid 51, allowing the pawl tooth to drop into neutral pawl recess 45.

When it is desired to shift the back gear from this neutral position to the low position, solenoid 51 is again energized, pulling up pawl 48 and motor 42 is energized to rotate shaft 40 and collar 43 until the low pawl recess 46 is substantially opposite the pawl tooth. At this time solenoid 51 is deenergized and pawl tooth 49 is allowed to drop into the low pawl recess 46 when these two elements are opposite each other. Such low position is detected by a microswitch 54 operatively associated with a second cam 55 fast to shaft 40.

The high back gear position which is illustrated in FIGS. 3 and 9 is sensed by a microswitch 56 operatively associated with a portion of cam 53.

Brake Assembly With Power Driven Actuator

As shown in FIG. 3, the lower side 24 of the driven pulley is formed with a depending annular flange 58 which serves as a brakedrum against the inner cylindrical surface of which a pair of brakeshoes 59 can be pressed.

Referring to FIG. 7, brakeshoes 59 at one pair of opposing ends are suitably pivoted together as indicated at 60 and urged together by springs 61. The unconnected ends of the brakeshoes have arranged therebetween a spreading cam 62 mounted on a shaft 63 which extends horizontally through housing 5 to the exterior thereof. On the outer end of this brake shaft is fast a crank 64 and to the free end of this crank is connected one end of the pneumatic actuator 65, the other end being suitably mounted to the bottom of assembly D.

It will be seen that when actuator 65 is activated it will cause rotation of shaft 63 and cam 62 to spread shoes 59 outwardly against brake drum 58, thereby slowing down rotation of spindle 8 when back gear 34 is in its high or low position. Braking the driven pulley of assembly 10 reacts through belt 30 to the drive pulley which is fast to drive motor shaft 20.

Spindle Speed Detector

In accordance with the present invention it is desirable, as will be explained infra, to detect when the rotation of shaft 20 has either stopped or been reduced to a predetermined low speed level such as 100 rpm. For this purpose, a rotational speed detector of the centrifugal type indicated generally at 66 in FIG. 3 is suitably secured to the lower end of shaft 20 and is operatively associated with a microswitch 68.

Referring to FIGS. 4-6 which illustrate the details of speed detector 66, the same is shown as comprising a case 69 secured to shaft 20 by screws 67 and having four opposed pockets or recesses 70 each having a horizontal shelf 71 on which a ball 72 can rest in an unstable condition when acted upon by centrifugal force. Vertical movement of each ball is detected by positioning these balls between a lower horizontal plate 73 and an upper position horizontal plate 74. This lower plate is shown as retained against an upwardly facing shoulder provided on a vertically disposed and movable plunger 75 having a reduced upper end to which is suitably connected upper plate 74. The lower end of plunger 75 emerges through a hole provided in the bottom of case 69 and is adapted to engage the trip lever 76 of microswitch 68 when this plunger is in a lowered condition as depicted in FIG. 5.

It will be seen that when shaft 20 is rotating above a predetermined speed, centrifugal force acting upon balls 72 cause them to move radially outwardly and in the course of such movement each ball effectively walks up onto its shelf 71 and rests there, holding plates 73 and 74 and plunger 75 in a retracted or upper condition, as depicted in FIG. 4. However, when the rotational speed of the shaft drops below a predetermined level centrifugal force is no longer effective in holding the balls on their respective shelves and these balls therefore roll off their shelves and fall onto lower plate 73. By the weight of the plunger and the plates connected thereto and the weight of the balls resting on the lower plate, this plunger is caused to move downwardly to the extended position depicted in FIG. 5. During such downward movement microswitch 68 is actuated and detects the low speed condition.

Mechanism Releasably Holding Working Tool On Spindle

Spindle 8 and a working tool T must be adapted for connection to each other whereby the tool is firmly held on the spindle. For this purpose and as shown in FIGS. 10 and 11 the spindle is tubular and has at its lower end an internally tapered tool-receiving end section or socket 78. Each of the working tools T has an externally tapered spindle-insertable end portion 79 adapted to be inserted into and seated on tapered section 78.

Tool end portion 79 is shown as being formed on an adapter herein referred to as a tool holder 80 which is separate from the bit end 81 of the tool. This is desired so that conventional metal working tools can be adapted for mounting on spindle 8. The upper end of a bit 81 is shown arranged in an axial recess 82 provided in the bottom of holder 80 and secured thereto by a radial set screw 83. However, as used herein and in the appended claims, a working tool such as T is intended to include a metal cutting device of one or more pieces as long as it has a bit end and an opposite mounting end and whether or not a holder such as 80 is provided separate or separable from the bit portion.

The tool holder portion 80 of a working tool T is shown as having an annular yoke groove 84 the bottom wall of which has a radial recess 85 for a purpose to be explained infra.

Means are provided for indexing a working tool T relative to spindle 8 so as to orient these elements angularly relative to each other and also to lock the two elements together against relative rotation, such means being shown as including a longidudinally extending groove or keyway 86 which extends to the upper end face 88 of holder 80 and a radial key 89 carried by the spindle. Key 89 specifically is shown as a screw screwed into a recess in the side wall of the spindle and having a head projecting inwardly of the tapered section 78 and received in keyway 86.

Means are provided for releasably locking a working tool T to spindle 8. Broadly considered, such means include a tool hook 90 and a spindle hook 91. The tool hook is formed as a recess 92 in end face 88. This hook recess has a reduced mouth or entrance 93 which is formed by an inturned annular lip 94 to provide the tool hook. The spindle hook is provided by a slide member 95 arranged in a cylindrical bore section 96 in the spindle and includes a plurality of circumferentially spaced fingers 98 severally projecting axially from slide member 95. The free end of each of these fingers 98 is radially movable and formed to provide an external hook 99. All such external hooks 99 collectively provide spindle hook 91 which is radially expandable and contractable.

The spindle hook when contracted is insertable through mouth 93 into recess 92 past lip 94 by axial movement of slide member 95 in a downward direction relative to the spindle. When in a relative axial position of the tool hook and spindle hook being overlapped, the spindle hook is expanded by cam means into locked engagement with the tool hook. Such cam means for causing in and out radial movement of fingers 98 include cam surfaces 100 severally on the radially inner sides of fingers 98 at their free ends, and a cylindrical cam 101 mounted on spindle within the cluster of fingers and engageable with cam surfaces 100. Cylindrical cam 101 is shown as mounted in its central position by a plurality of fin-like radial struts 102 severally extending through the spaces between adjacent pairs of fingers 98. Four such radial struts are shown which at their inner ends are connected to cylindrical cam 101 and at their outer ends to a cylindrical sleeve 103 which is suitably held stationary within the spindle bore 96.

Means are provided for ejecting the working tool T which is arranged on the spindle following disengagement of the spindle and tool hooks. Such tool ejection means are shown as being responsive to axial movement of slide member 95 in a downward direction. More specifically, such tool ejection means includes a sleeve member 104 arranged within and slidable on sleeve 103 and having axially extending slots which receive severally struts 102. The lower end of this sleeve member 104 is adapted to engage and bear against tool end face 88 when pushed thereagainst by a downwardly facing shoulder 105 on sleeve 95 engaging the upper end face of this ejector sleeve member.

In order to prevent unintended reengagement or snagging of the tool hook 90 and spindle hook 91 upon lowering of tool holder 80 relative to spindle 8, the separation between tapered surfaces 78 and 79 permitting some relative lateral movement which might cause such hooking, a guide spider is provided on the lower end of cylindrical cam 101. This guide spider includes a plurality of radial fins 106 suitably formed on the extreme lower end of cam 101 and extending downwardly therebelow. The circumferential periphery of these fins is such that they have a diameter which is slightly less than the diameter of the mouth to hook recess 92. Thus as the tool holder lowers relative to the spindle, leaving the recess therein, the edges of these spider fins 106 will be adapted to engage the edge of the inturned lip 93 in order to guide the tool holder more or less centrally with respect to the spindle as it leaves the spindle.

Means are provided for moving the spindle hook member 91 longitudinally thereof. Such means includes a drawbar 108 having its lower end connected to spindle hook member 95 as by a threaded connection indicated at 109 and having its upper end formed to permit it to be attached to a pulling or pushing device while either pulling a working tool T into the spindle preparatory to firmly holding it therein or during ejection of a working tool from the spindle.

Referring to FIGS. 10 and 11, the upper end of tubular spindle 8 is shown as extended by a tubular extension 110, considered as a part of the spindle, which is externally threaded and has a pair of diametrically opposite longitudinal grooves or keyways 111 and 112. On this threaded end is screwed a spindle nut 113. Arranged immediately thereabove is a collar member 114 having radial keys 115 and 116 received in grooves 111 and 112, respectively. Collar 114 also has a downwardly axially extending lug or key 118 which is received in an upwardly facing keyway 119 provided in spindle nut 113 so as to lock this spindle nut against rotation relative to the spindle once the retainer collar is positioned as shown. This spindle collar 141 is also provided with an external groove 120 extending its full axial extent over lug 118 and is adapted to receive the tooth of a pawl member as will be explained infra.

Immediately above collar member 114 is a cup-shaped lock washer 121 which is also keyed to the grooved threaded upper end of the spindle and has a series of upstanding tabs 122 any one or more of which is adapted to be turned inwardly into radial holes 123 provided in the lower end portion of a spindle yoke member 124. This yoke member is threadedly mounted on the spindle and after being in position the tabs 122 can be bent over into holes 123 so that the yoke member is also locked against rotation relative to the spindle. Yoke member 124 has an external annular groove 125 intermediate its ends.

Extending upwardly through tubular yoke member 124 is the upper end portion of drawbar 108 which has an externally threaded section 126, preferably an acme thread. Arranged on and fast to the upper extreme end of the drawbar is a drawbar yoke member 128 also having an annular groove 129 and carrying on its lower end face a downwardly extending stop pin 130.

Arranged between the upper end of the spindle yoke member 124 and the lower end of the drawbar yoke member 128 is a drawbar nut member 131 which has a threaded engagement on the drawbar threaded section 126. This drawbar nut has an upwardly projecting stop pin 132 standing out from its upper face so that as the nut member is turned toward the drawbar yoke member there comes a time when the two pins 130 and 132 overlap and prevent a jamming engagement between the opposing end faces of these members.

As shown in FIG. 10, the lower end face 133 of drawbar nut member 131 is adapted to abuttingly engage the upper end face 134 of spindle yoke member 124.

It will be seen that if the drawbar nut member 131 is screwed down firmly against spindle yoke member 124 the drawbar 108 will be tensioned so as to firmly interengage spindle hook 91 with the tool hook 90 and thereby pull the tool T upwardly into a firmly seated engagement on the lower end of the spindle 8.

When it is desired to release a working tool from the spindle after having been used, the axial hold by the drawbar 108 through the spindle hook 91 must be released in order to allow this spindle hook and tool hook 90 to disengage to free the tool for removal from the spindle. Means are provided for holding the spindle against axial displacement while means pull on the drawbar with a relatively high level of force in order to relieve the jam between nut member 131 and spindle yoke member 124. Also, means are provided for rotating the drawbar nut 131 to move it axially along the threaded section 126 away from the spindle yoke member 124 and thereby loosen it and allow the drawbar to move vertically downwardly. Further, means are provided for pushing the drawbar vertically downwardly in order to eject the working tool from the spindle.

To accomplish the aforementioned purposes the various means stated include the provision of axially extending gear teeth 135 on the periphery of drawbar nut member 131 and the drawbar operating mechanism D supported on the top of the machine. Specwifically mechanism D includes a lower mount plate 136 suitably secured to machine housing 5 and supports a removable cover 138.

Figure 21:
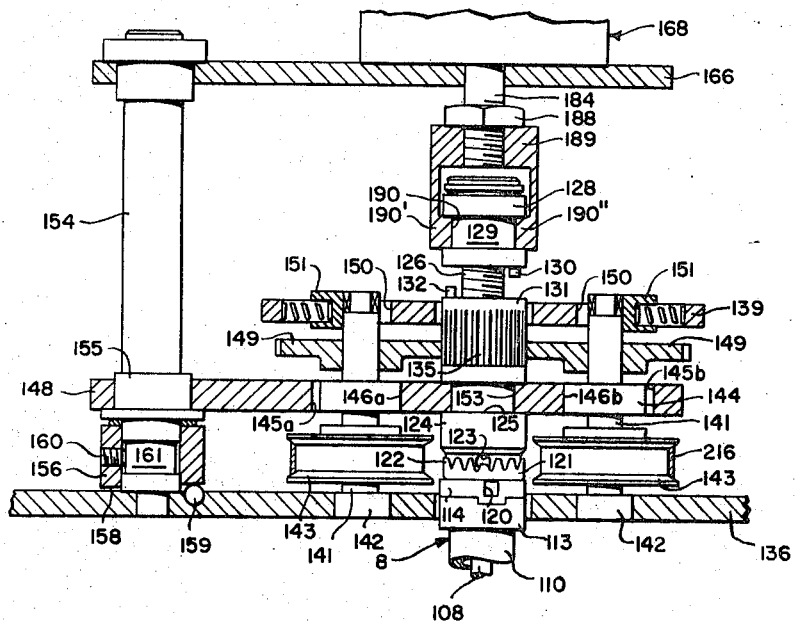
FIG. 21 is a fragmentary vertical sectional view of the drawbar operating mechanism, taken on line 21—21 of FIG. 17, and illustrating the operative condition of the mechanism for turning the drawbar nut.
Figure 22:
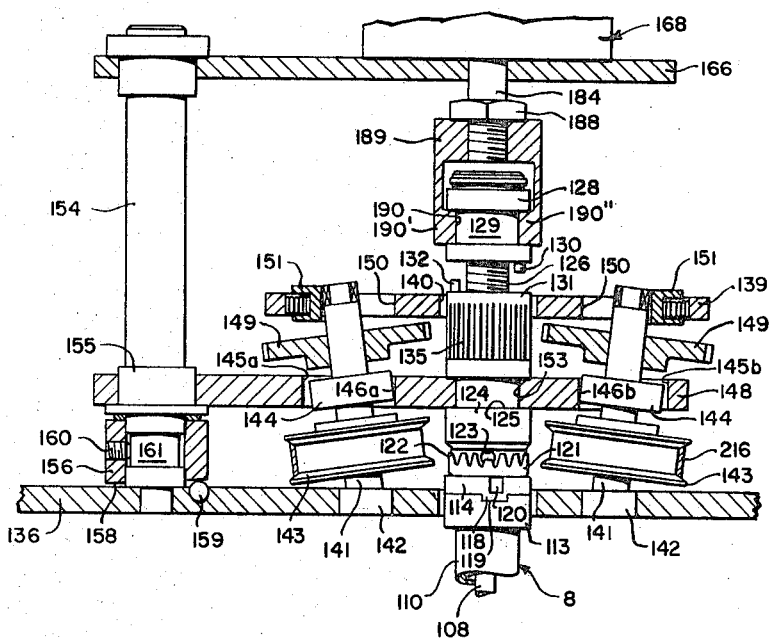
FIG. 22 is a view similar to FIG. 21 showing the drawbar nut turning mechanism is an inoperative condition.

Referring to FIGS. 16–23, vertically spaced above mount plate 136 is another stationary plate 139 which has an enlarged opening 140 therein through which the upper end of the drawbar assembly shown in FIGS. 10 and 11 is freely movable. Arranged on diametrically opposite sides of the upper threaded end portion of drawbar 108 when within mechanism D are a pair of tiltable shafts 141. Each of such shafts is suitably journalled at its lower end as in a spherical bearing 142 mounted on plate 136. Immediately above such lower end mounting, each shaft carries a pulley 143 fast thereto. Above such pulley each shaft carries a bearing 144 which acts as a cam follower rollingly arranged in a camway indicated at 145a for one and at 145b for the other. Camway 145a has a cam surface 146a, and camway 145b has a cam surface 146b. These camways 145a and 145b are provided in a lower pivot plate 148. Above bearings 144 each shaft 141 has fast thereto a drive gear 149 having teeth on its periphery adapted to mesh with the axially elongated external teeth 135 on drawbar nut member 131. Above such gear each shaft is guided for movement toward and away the vertical axis of the drawbar 109 and in a plane radial with respect thereto by an elongated slideway 150 in which a slide assembly 151 spring biased toward the drawbar axis is arranged and adapted to bear against the upper end of the corresponding shaft 141 so as to urge the upper end of this shaft toward the drawbar. When the teeth on a drive gear 149 mesh with those on the drawbar nut 131 the shaft 141 is in an upright position having its axis generally parallel to that of drawbar 108, as illustrated in FIG. 21.

Lower pivot plate 148 has an enlarged through-hole 152 of transverse dimension greater than the diameter of any of members 124, 131 and 128. On one side of this hole 152 plate 148 is provided with a generally semi-circular recess 153 the side wall portions of which provide a fork 153' adapted to be received by the annular groove 125 in spindle yoke member 124 when relative movement occurs between this lower pivot plate and the spindle yoke member.

Lower pivot plate 148 is mounted for pivotal movement about a vertical axis provided by a pivot post 154 surrounded by a bushing 155 in turn received by an opening in this plate. The outturned flange of this bushing below pivot plate 148 is shown as opposing and engaging the upper end face of an adjust collar 156 which surrounds the lower portion of pivot post 154 immediately above mount plate 136. The lower end face 158 of this adjust collar has a slant with respect to a perpendicular plane traversing the vertical axis of pivot post 154. T0is slanted lower end face is adapted to engage an upwardly projecting salient 159 preferably provided by a roller received in a recess provided in the upper surface of lower mount plate 136. The adjust collar has a radial threaded hole in which a set screw 160 is arranged which can be tightened up so that its inner end bears against the bottom of a shallow annular groove 161 provided in the exterior of pivot post 154 opposite this set screw. After loosening this set screw and turning adjust collar 156 through the desired angular position so as to react against salient roller 159 and thereby raise or lower plate 148 as desired, the set screw 160 is retightened to maintain this adjustment. In this manner, the alignment between the spindle fork 153' carried by plate 148 and the spindle yoke member 124 is adjustable to provide the optimum interengagement between this fork and yoke when the drawbar is in its uppermost position.

Lower pivot plate 148 can be pivoted back and forth between two angular positions by a pneumatic actuator 162 and a return spring 163, one position being shown by full lines and the other position by broken lines in FIG. 18. One end of this actuator and the corresponding end of this return spring are connected to a vertical pin 164 suitably mounted on pivot plate 148. The opposite ends of this actuator and return spring are suitably connected to a fixed post 165 mounted on mount plate 136. The extent of travel of lower pivot plate 148 between the aforementioned extreme angular positions is determined by the limits of movement permitted by actuator 162. In other words, this actuator bottoms out in both directions and preferably is adjustable.

Figure 23:
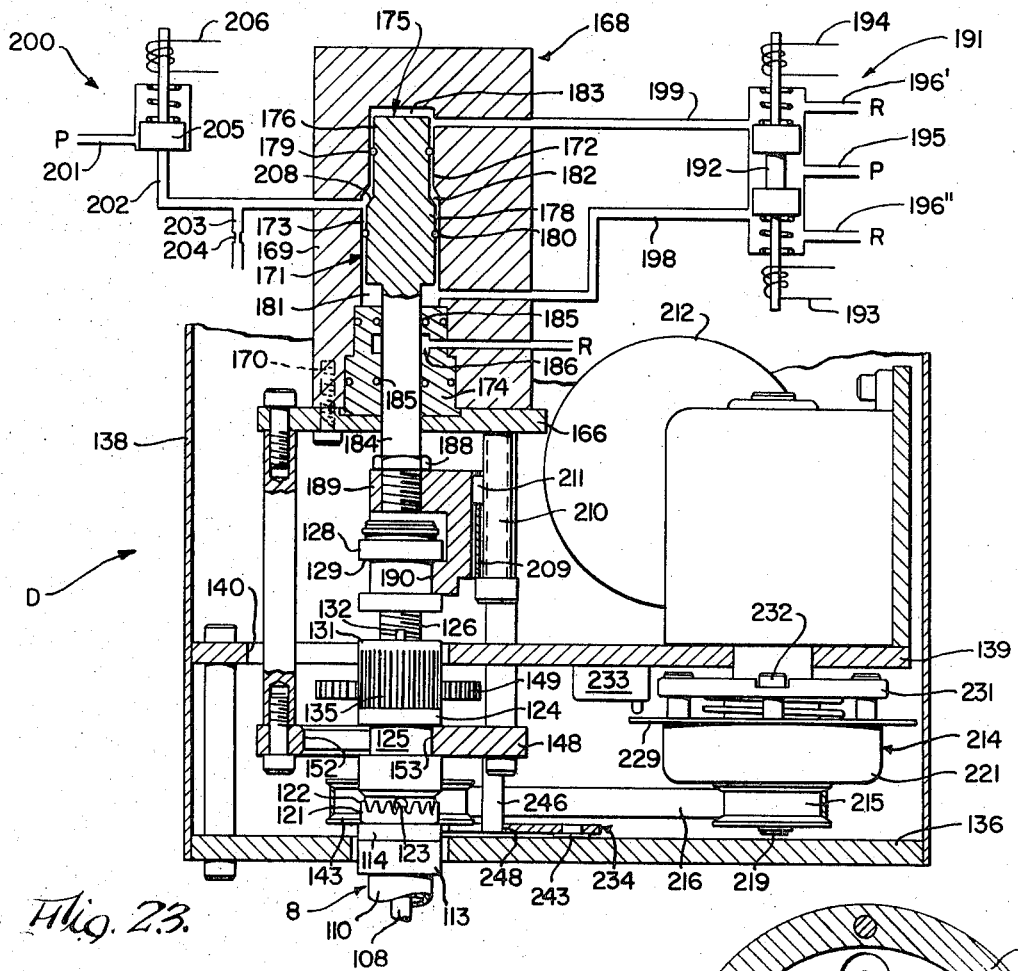
FIG. 23 is a fragmentary enlarged transverse vertical sectional view thereof taken on line 23—23, FIG. 16.
Figure 25:
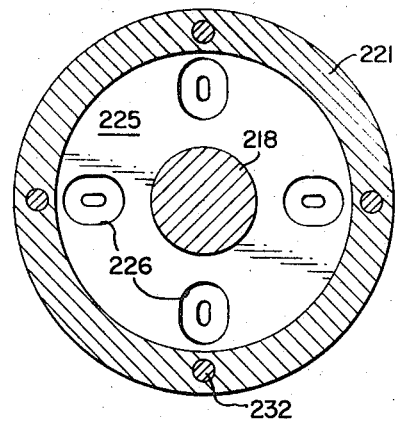
FIG. 25 is a horizontal sectional view thereof taken on line 25—25, FIG. 24.

The means for exerting a pull or push on drawbar 108 are carried by an upper pivot plate 166 which is secured to lower pivot plate 148 by suitable spacer and fastening means so that these two plates move as a unitary structure. Such drawbar actuator means are best shown in FIG. 23 and comprise a hydraulic actuator 168 including a cylinder member 169 suitably mounted on upper pivot plate and secured thereto by screws 170 which extend through this plate and screw into the body of the cylinder member. This cylinder member has a stepped bore 171 including an upper section 172 of smaller diameter than a next lower section 173. The lower portion of the cylinder bore is closed by an end head 174 which is suitably sealed externally and internally. Slidably arranged in the stepped working bore of cylinder member 169 is a stepped piston head 175 having an upper head section 176 of reduced diameter and a lower section 178 of larger diameter, these sections severally being sealed against the surrounding wall surface of the cylinder bore. Specifically, the upper smaller head section 176 is sealed by a seal ring assembly 179 including an O-ring arranged in a glide and the larger lower section 178 is sealed to the surrounding bore by another similar seal ring assembly 180 on the bore wall. The upper and lower end faces of the piston head are spaced from the respective end surfaces of the bore chamber of the cylinder body so as to provide three chambers, a lower chamber 181 arranged between end head 174 and lower seal ring assembly 180, an intermediate chamber 182 arranged between lower and upper seal ring assemblies 180, 179, and an upper chamber 183 arranged between upper seal ring assembly and the upper wall of the cylindrical bore.

A piston rod 184 is shown as integral with the stepped piston head 175 of the hydraulic actuator and this piston rod extends through a bore provided in end head 174, the bore wall of this end head having a series of annular grooves, the upper and lower ones of which are occupied by seal ring assemblies 185 and the intermediate one 186 of which is vented to fluid return R to take care of any leakage that may escape from lower chamber 181.

The lower end of piston rod 184 is shown as having a threaded connection secured by a lock nut 188 to a drawbar fork member 189 having a lower part provided with a generally semi-circular recess 190 leaving fork arms 190' and 190'' adapted to enter the annular groove 129 provided in drawbar yoke member 128.

Means are shown for controlling the flow with respect to the various chambers 181, 182 and 183. Upper and lower fluid chambers 183 and 181 are serviced by a 4-way three position solenoid valve 191 shown as having a spring centered valve spool 192 adapted to be moved downwardly by energization of a lower solenoid coil 193 and upwardly by energization of an upper solenoid coil 194. Operatively associated with valve spool 192 is a central pressure port 195 and two axially spaced return ports 196' and 196''. An actuating conduit 198 communicates lower chamber 181 with the space of the solenoid valve bore between pressure port 195 and lower return port 196''. Another conduit 199 communicates upper chamber 183 with the solenoid valve bore intermediate pressure port 195 and upper return port 196'. The axial length of the solenoid valve spool 192 is such as to be underlapped with respect to the axial spacing between the ends of conduits 198 and 199 where they communicate with the solenoid valve bore.

A two-way solenoid valve 200 is shown as being operatively associated with intermediate chamber 182. The same comprises a cylinder bore having a pressure port 201 adjacent one end and entering in the side wall thereof and in the adjacent end wall is another port connected by a conduit 202 leading to chamber 182. Intermediate its ends, conduit 202 is shown as having a lateral branch 203 in which a restricted orifice 204 is arranged. The valve slide 205 of this solenoid valve is spring biased toward a seated condition against the port in the end wall of the valve cylinder but can be lifted off this end wall to establish communication between such port and the pressure port 201 by energization of a solenoid coil 206.

The drawbar actuator just described is adapted to exert two levels of upward pulling force on the drawbar and a single level of downward pushing force thereagainst. Assuming drawbar fork member 189 is operatively connected to drawbar yoke member 128, the high level of upward pulling force is exerted by the actuator by energizing lower solenoid coil 193 while keeping upper solenoid coil 194 deenergized so as to move the valve spool 192 of the 4-way solenoid valve 191 downwardly, establishing communication between pressure port 195 and lower conduit 198 leading to lower chamber 181 and establishing communication between upper return port 196' and upper conduit 199 leading to upper chamber 183.

When it is desired to exert an upward pull on the drawbar but at a lower level of force, pressurized fluid is introduced into lower chamber 181 in the manner just described. At the same time, the coil of 2-way solenoid valve 200 is energized so as to introduce pressurized fluid into intermediate chamber 182 which is effective against the upwardly facing annular shoulder 208 on the stepped piston head to provide a downward force which substracts from the more dominant upward force applied by the fluid in lower chamber 181. The result of this is a net upward force of less value than when pressurized fluid is not introduced into intermediate chamber 182.

When it is desired to push the drawbar downwardly, the upper coil 194 of the 4-way solenoid valve is energized while the lower coil 193 thereof is deenergized so as to raise the valve spool 192 and establish communication between pressure port 195 and upper conduit 199 and between lower return port 196'' and lower conduit 198. This first connection allows pressurized fluid to enter upper end chamber 183 while lower end chamber 181 is vented to return, and thereby provide a downward thrust on the piston head which is transmitted through the assumed connected drawbar fork and yoke members.

Adverting again to the pivotal movement of the pivot plates 148 and 166 on the latter of which the hydraulic actuator 168 is mounted, the lighter upward pull exerted by this actuator occurs when a new working tool T is being seated in the spindle 8. Following such seating, the manner for which will be explained in greater detail infra, the pivot plate assembly is swung to a disengage position in which drawbar fork member 189 separates from drawbar yoke member 128. At this time it is desirable to maintain this fork member in the same relative position to the drawbar yoke member when the latter returns again for replacement of the working tool just mentioned. For this purpose, means are provided for frictionally holding the drawbar fork member relative to upper pivot plate when separation occurs between this drawbar fork member and the drawbar yoke member. Such means are shown as including a split clamping or gripping spring 209 the arms of which embrace a depending post 210 carried by upper pivot plate 166 and extending adjacent the closed side of the drawbar fork member 189. In order to secure this clamping or gripping spring to this fork member, such spring is provided with a hole which receives the end of a pin 211 carried by the closed end of fork member 189.

Means are provided for driving the pulley 143 at the lower end of each tilt shaft 141. Such means are adapted to drive nut member 131 in both directions alternately, driving it in one direction in order to loosen the nut and in the opposite direction in order to tighten the nut. For this purpose, the stationary plates 136 and 139 of the drawbar operating mechanism are shown as supporting an electric motor 212 having a vertically disposed output shaft 213 projecting downwardly through an opening in upper stationary plate 139.

Figure 24:
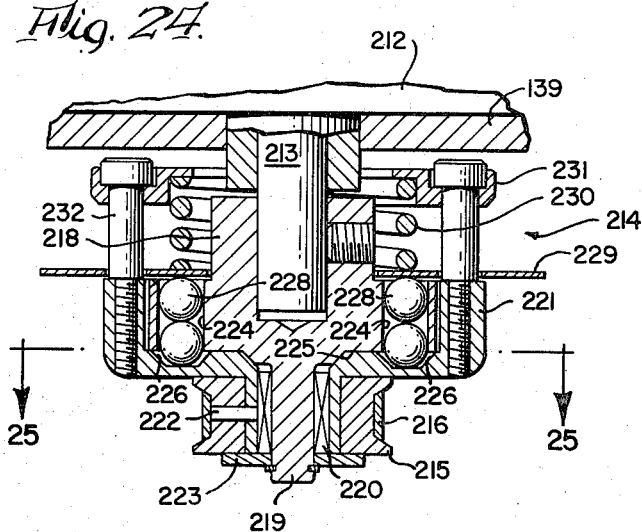
FIG. 24 is a fragmentary enlarged vertical central sectional view of a slip clutch assembly in the power drive of the drawbar operating mechanism, taken on line 24—24 of FIG. 17.

As shown in FIGS. 23 and 24 a slip clutch assembly 214 is operatively interposed between shaft 213 and a drive pulley 215. A belt 216 passes around this drive pulley and also around the two driven pulleys 143 severally mounted on the two tilt shafts 141.

Slip clutch assembly 214 is shown as comprising a drive coupling 218 suitably non-rotatably mounted on shaft 213 and having a depending stem portion 219 surrounded by a needle bearing 220 which also engages a surrounding slip coupling member 221. Pulley 215 is non-rotatably secured to slip coupling 221 by a dowel pin 222 and is retained on the hub of this slip coupling by a thrust washer 223 suitably secured on stem 219 to hold the needle bearing 220, slip coupling member 221 and pulley 215 against axially downward displacement. Drive coupling 218 has a series of circumferentially spaced through holes 224 the lower ends of which oppose an upwardly facing surface 225 formed on slip coupling member 221. Four such holes are shown and when the clutch is in driving condition, the lower end of each hole is opposite a V-shaped groove 226 provided in surface 225. Arranged in each such through hole 224 is a pair of balls 228 the upper ones of which in the four series so provided supporting a switch plate 229. This switch plate is urged downwardly by a helical compression spring 230 retained by a spring seat member 231 secured at circumferentially spaced intervals by shoulder screws 232 the lower ends of which screw into threaded holes provided in slip coupling member 221. Switch plate 229 is adapted to engage a microswitch 223.

When the resistance to turning of the driven slip coupling member 221 is below a predetermined level the lower balls 228 will project into recesses 226 and since the upper portion of these balls is still confined within the vertical holes 224 in drive coupling member 218 an effective drive coupling is established between members 218 and 221. However, should such resistance to turning of the slip coupling member 221 exceed such predetermined level, the lower balls 228 will cam themselves out of the grooves 226, lifting the balls immediately thereabove and the switch plate 229 against the urging of the holddown spring 230. Lifting of such switch plate is operative to energize microswitch 233 and thereby signal slippage of the clutch.

This clutch 214 cooperating with microswitch 233 is utilized to detect slippage of the clutch which will occur at the end of loosening travel of the drawbar nut 131 as when the pins 130 and 132 overlap and upon tightening of the nut by turning the same in the opposite direction as when the opposing end surfaces 133 and 134 of nut and the spindle yoke abuttingly engage.

Means are provided for indexing spindle 8 prior to operating the drawbar operating means D for releasing the axial hold on working tool T preparatory to its removal from the spindle. After the cycle of operation of a given working tool T arranged in the spindle has been completed, the spindle drive motor 9 is shut off and the back gear mechanism 11 is shifted to a neutral position all as will be explained in greater detail infra. But, assuming this has occurred, the next step to be taken is to index the spindle in a predetermined angular position so that it can in turn orient the working tool still arranged therein, which is oriented relative to the spindle in a predetermined position as provided by the interlocking pin and recess connection 86 and to thereby orient the tool holder 80 is a predetermined position, so that when it is picked up by the grasper G later to be described it will be oriented in a predetermined position relative thereto.

The means for indexing the spindle prior to operating release of the axial hold on the working tool comprises a pawl member 234 formed to provide a pawl tooth 235 having a flat surface 236 adapted to engage a radial flat surface 238 formed by groove 120 in spindle collar member 114. Pawl member 234 is arranged immediately above lower mount plate 136 and is supported thereon for pivotal movement relative thereto so that it can present its tooth 235 to spindle collar groove 238. For this purpose pawl member 234 is shown as having a lateral extension in which an elongated slot 239 is provided, the general direction of elongation of which is generally perpendicular to its flat surface 236. Received in this elongated slot is a pivot pin 240 vertically supported on lower mount plate 136. Spring means 241 are provided for urging the pawl member 234 to move relative to fixed pivot pin 240 so as to bottom the end of slot 239 remote from said flat stop surface 236 against this pin and also for applying a couple to the pawl member, urging the same to pivot about pin 240 in a direction so as to urge the pawl tooth toward the spindle. For this purpose, tension spring 241 is secured at one end to pawl member 234 and its opposite end to a fixed post 242 secured to lower mount plate 136. The direction of force applied by such spring is to one side of pivot pin 240 so that this spring applies a force to produce a couple urging the pawl member to rotate in a clockwise direction as viewed in FIG. 19 thereby urging its pawl tooth toward the spindle. With the spring so causing the pawl member to move toward the spindle, it will be seen that if the spindle is rotated with its collar member 114 until the pawl recess 120 in such collar is opposite pawl tooth 235, this pawl tooth will drop into such recess whereby the opposing radial surfaces 236 and 238 engage. The momentum of the spindle due to its rotation will cause a forceful abutment of recess surface 238 against pawl tooth surface 236 which will tend to displace pawl member 234 so as to move the other end of the elongated slot 239 therein toward the stationary pin 240 against the urging of spring 241. In this manner a cushioned stopping of rotation of the spindle is permitted when the stop surfaces engage by the relative sliding movement of the pawl member on the pivot pin.

Sliding movement in the manner and direction just described and also transversely toward and away from the spindle is facilitated by a glide button 243 preferably of teflon carried by the pawl member 234 and interposed between it and the upper flat surface of lower mount plate 136.

Pawl member 234 also includes a tail part 244 adapted to engage a microswitch 245 when pawl tooth 235 drops in spindle collar recess 120. The circuit associated with the so closed microswitch signals that the indexing of the spindle has been completed.

Means are provided for removing the tooth of the pawl member from the pawl recess on the spindle when it is desired to free the spindle for rotation, as when the assembly comprised of the lower and upper pivot members 148 and 166 is swung from the full line to the broken line positions shown in FIG. 18. In this latter position, the spindle fork member 153' disengages from the spindle yoke member 124 and the cam surfaces 146a and 146b of the camways 145a and 145b cause the gear shafts 141 to tilt their upper ends away from the drawbar and thereby disengage their gears 149 with the tooth drawbar nut member 131. Such means for withdrawing the pawl tooth includes a pin 246 depending from lower pivot plate 148 and adapted to engage an inclined cam surface 248 on pawl member 234 so that when this lower plate member is pivoted about the axis of post 154 in a clockwise direction, this depending pin 246 engages this pawl surface 248 and swings the pawl member so as to withdraw the pawl tooth from the pawl recess.

As previously stated, the limit of movement in this clockwise direction is determined by the pneumatic actuator 162. Prior to reaching its limit of movement, the tail 244 of the pawl member actuates another microswitch 249 signaling that the pawl tooth has been removed from the pawl recess and also that the forks 153' and 190 have been removed from their respective yokes 124 and 128. Considering for the moment the reverse action of pivotal movement of the pawl member, when the lower pivot plate carrying the depending pin 246 swings in a counterclockwise direction about the axis of post 154 as viewed in FIG. 18, the extent of movement is such that some separation takes place between pin 246 and cam surface 248 on the pawl member, thereby enabling unrestrained entering of the pawl tooth into the pawl recess under the urging of the pawl spring.

Working Tool Transfer Mechanism

Transfer arm A is movable between a first angular position adjacent tool rack R to a second angular position adjacent spindle 8. This arm is mounted for such pivotal movement about an axis which is generally parallel to the rack and spindle axes, assumed to be vertical, and is also mounted for translation axially of such axes or in a vertical direction. This arm also mounts a working tool grasper G which is arranged for extension and retraction relative to the arm.

Arm A includes an inverted U-shaped lower horizontal section 250 and at its elbow end a tubular upper vertical section 251. The upper end of section 251 is connected to means for rotating arm A, as will be explained infra. Lower arm section 250 having a top wall 252 and depending side walls 253 and 254, houses grasper G.

Arm A is mounted for pivotal movement about the vertical axis of a stationary elongated tubular pivot 255 secured to a part 256 of gear housing H in a manner to be more fully described infra.

Arm A is also arranged for vertical translational movement along the vertical axis of pivot 255, as will be explained more fully infra.

The means for rotating or pivoting arm A between an angular position adjacent rack R to another angular position adjacent spindle 8 include drive motor means 257, rotary crank means 258 driven by such motor means, geneva motion means 259, link means 260 operatively interposed between such crank means and geneva motion means and step-up gear means 261 operatively interposed between the geneva motion means and arm A.

These various means 257–261 are suitably mounted on housing H which is a generally pan-shaped casing having a bottom wall 262 from which an integral generally vertical attaching plate 263 extends, an integral upstanding side wall 264, and a removable cover 265. Suitable fasteners (not shown) are adapted to extend through a plurality of horizontal slots 266 provided in plate 263 for securing this plate and thereby housing H as a whole to machine pedestal 2.

The drive motor means 257 includes an electric drive motor 268 suitably mounted on casing bottom wall 262 and having a vertical upstanding shaft 269. Rotatably mounted on a horizontal plate 270 secured to casing side wall 264 adjacent its upper edge and within the casing is a rotary member 271 which serves the function not only of a crank but also of a cylindrical cam as will be explained infra.

Operatively interposed between rotary member 271 and drive shaft 269 is a slip clutch mechanism 272 which includes an upper thrust plate 273, a series of six microswitch cam discs, 274, 275, 276, 277, 278 and 279, a series of friction discs 280 interposed alternately between the cam discs, and a lower pressure plate 281. Cam discs 274–279 and pressure plate 281 are slidably mounted on a series of vertically disposed studs 282, the upper ends of which screw into threaded recesses in the hub portion 283 of rotary member 271. The lower end portion of each stud 282 is threaded to receive a nut 284. Between this nut and pressure plate 281 are disposed one or more belleville washers 285 which react to urge the stack of alternating friction discs and switch cam discs into frictional engagement with one another on their opposing and contacting faces. The friction discs 280 are suitably non-rotatably secured to a coupling member 286 fast to shaft 269.

Supported from the same plate 270 supporting rotary member 271 are a series of six microswitches 288, 289, 290, 291, 292 and 293 adapted to cooperate with the peripheral cam edges of cam discs 274–279, respectively.

Screwed into the top of rotary member 271 and displaced laterally from the vertical central rotary axis thereof is a crank pin 294 pivotally connected to one end of a link 295, the other end of which is suitably pivotally connected to the upper end of a pivot pin 296 carried by a drive member 298 of a geneva motion mechanism. The drive member of this geneva mechanism is indicated at 299 and comprises a disc in the upper surface of which a radial slot 300 is provided and adapted to receive and cooperate with a depending roller 301 carried by member 298.

This geneva drive member 298 is fast to a shaft 302 journalled at its lower end on casing bottom wall 262 and at its upper end on a bearing plate 303 suitably removably secured to casing side wall 264 adjacent its upper edge. Driven geneva member 299 is fast to a vertical shaft 304, the lower end of which is also journalled on wall 262 and at its upper end is journalled on plate 303. Fast to geneva driven member 299 is a drive gear 305, preferably formed integrally therewith, this gear being adapted to mesh with a pinion member 306 having vertically elongated teeth 308 at its upper end and adapted for connection at its lower end to the upper end of upper section 251 of arm A.

In order to adjust the effective length of link 295 the end thereof shown connected to geneva drive member 298 is shown as provided with an opening receiving a bushing 309 having an eccentric mounting portion 310 which receives the upper end of pivot pin 296 carried by this member. By turning the bushing in the opening provided in the link the center to center spacing between pins 294 and 296 is varied and when the desired spacing has been achieved, the adjustment of the eccentric bushing relative to link member is maintained by clamping the end of the link member to this bushing. For this purpose the end of the link 295 is bifurcated and carries a clamping screw 311.

Inasmuch as a geneva motion mechanism produces intermittent rotary movement and it is desirable for a purpose which will be made clear infra that the drive member should move through an arcuate path greater in circumferential extent than that through which the geneva motion driven member passes and for the purpose of securing the geneva mechanism in a locked condition when the drive connection between the geneva drive member and driven member no longer obtains, the geneva drive member is provided with a pair of downwardly opening curved locking grooves 312, 313 severally adapted to receive alternately upstanding locking pins 314, 315, respectively, carried by geneva driven gear member. These grooves are circular in shape and have the axis of shaft 302 as their center. Positioning the locking pins in the grooves occurs only at the ends of the intermittent travel of the drive member relative to the driven member.

In order to obtain the desired smooth interaction between the locking pins 314, 315 and the grooves 312, 313 these locking pins are individually made adjustable on the driven member 299. For this purpose, as best shown in FIG. 34 each locking pin has an eccentric mounting portion 316 rotatably arranged in a cylindrical recess in member 299 so that by turning this pin as by inserting a screwdriver into the slot provided at the upper end thereof, the circumferential position of the axis of the exposed head portion of the pin can be shifted. When shifted to the desired location it can be maintained in this condition by tightening down on a clamping screw 318 arranged immediately along side.

In order to provide a proper mesh between the teeth of geneva drive gear 305 and pinion member 306, this member is shown as rotatably mounted on a portion of the tubular pivot 255 below an upper eccentric section 319 in turn adjustably mounted in a hole provided in housing part 256. The periphery of this eccentric section is cylindrical as is the hole in the housing part in which it fits so that by relative rotation between the housing and this eccentric portion the lower portion of the pivot 255 on which the pinion gear member 306 is directly mounted, can be swung closer toward or farther away within limits relative to the drive gear member 305 and thereby adjust the mesh of the teeth between these two members. When the desired angular adjustment of the eccentric portion 319 is obtained, it can be maintained by tightening a set screw 320 shown in FIG. 27 which extends radially in through the supporting structure of housing part 256. The inner end of the set screw is received in an annular groove 321 provided in the periphery of eccentric portion 319 so that when the set screw is bottomed in this groove, not only is the tubular pivot held against rotation about its longitudinal axis but also against vertical shifting along this axis.

The lower end of pinion member 306 is cylindrical and is received in a cylindrical recess 322 provided in the upper end face 323 of arm section 251. Means are provided for not only securing this arm section to the pinion gear member, but also for permitting angular adjustments therebetween. For this purpose, the lower end of the pinion gear member is shown as having a depending pin 324 received in an enlarged cavity 325 recessed from the upper end face 323 of arm section 251. A pair of chordal adjusting screws 326 are threadedly mounted on arm section 251 and are opposed diametrically so that their inner ends are adapted to bear against diametrically opposite sides of pin 324 carried by the pinion. It will be seen that by tightening one of these screws and backing off on the other, an angular shift can be achieved between the pinion gear member and the arm section. In order to allow for such relative angular movement, the upper end of the arm section has a series of indented portions indicated at 328 to provide outwardly extending flange portions 329 in which vertical slots 330 are provided, each such slot being elongated generally in a tangential direction. Through each of these slots extends a fastening screw 331 which screws into threaded recesses provided in the lower end face of the pinion gear member. By loosening these fastening screws 331 and then making the adjustment on the chordal screws 326, followed by retightening of the fastening screws, it will be seen that within the limits provided by slots 330 an angular adjustment between the pinion gear member and the arm section can be made.

This adjustment is desirable for positioning the longitudinal axis of the horizontal arm section 250 with respect to the vertical axis of spindle 8 when this arm section is in the position adjacent such spindle.

The means for causing vertical translation of the arm A will now be described. Extending through tubular pivot 255 is an arm lifter 332 also tubular. The lower end of this arm lifter is mounted in a bearing 333 held against vertical movement by suitable means supported on arm section 251. Such means are shown in FIGS. 36 and 37 as including a retainer plate 334 held by screws to secure bearing 333 against its seat provided in arm A. The lower end of arm lifter 332 is externally threaded to extend through this bearing and has a clamping nut 335 threaded on the lower end.

The upper end of arm lifter 332 is externally threaded to receive a clevis member 336 below which on the threaded section is arranged a lock nut 338. After first loosening this lock nut, by turning the clevis member relative to the lifter arm the effective length of this lifter arm can be varied.

Bearing against the downwardly facing shoulder provided by the overhanging portion of lock nut 338 with respect to lifter arm 332 is the upper end of a counterbalance spring 339 arranged in the annular space between tubular pivot 255 and the arm lifter. Referring to FIGS. 36 and 37, the lower end of this counterbalance spring bears against a thrust washer 340 in turn supported by a split ring or retainer 341 which acts as a stop. Thrust washer 340 is vertically movably within the bore of tubular pivot 255 for a purpose to be explained infra.

The upper end of clevis member 336 is pivotally connected to one end of a lever 342, the other end of which carries a cam follower roller 343 projecting laterally from one side thereof and arranged in a cam groove 344 formed in the periphery of rotary member 271. This cam groove has parallel cam surfaces which cooperate with the cam follower roller. This lever intermediate its ends is suitably pivotally mounted on plate 270. The cam groove 344 has a vertical throw so that by cooperation with the cam follower, rotation of member 271 will cause the adjacent end of lever 342 to move in accordance with the profile of the cam groove and cause a rocking of this lever, thereby raising and lowering the other end which is connected to the clevis member 336 and arm lifter 332, thereby raising and lowering arm A in the desired manner. This raising and lowering of arm A automatically causes a gripping finger 345 carried on a hand 346 to move in and out of effective gripping position, i.e. to close or open, as will be explained after the ensuing description of the hand which is housed within the horizontal lower arm section 250.

The lower end of this arm section 250 is covered by a plate 347 which is secured to this arm by a series of screws 347. This plate is part of a bracket member 348 which also includes a vertical plate portion 349 and an upper horizontal plate portion 350. The vertical space between this plate 350 and the lower edge of an arm front wall portion 351 provides generally an opening through which hand 346 can project from arm section 250. Hand 346 is a generally rectangular box-like member having at it outer end a generally U-shaped recess 352 leaving a pair of forward projections 353 and 354 on opposite sides to provide a fork-like outer hand structure. Recess 352 includes an inner semi-cylindrical curved portion 355, the axis of which extends generally vertically. Hand 346 is slidably mounted on a saddle-shaped guide bracket 356 which at its inner end is loosely tiltably connected to the upper ends of a pair of stud pins 358 and 359. The front portion of this saddle-shaped bracket is yieldably supported by a pair of transversely spaced compression springs 360 resting against the upper surface of the bottom cover plate 347 and extending upwardly through holes provided in the horizontal upper plate portion 350 and bearing directly against the bottom of this saddle-shaped member. The inner end of hand 346 is shown as provided with a pair of transversely shaped generally horizontal guide tubes 361 severally received in guide sleeves 362 supported on the end of a bracket 363 suitably connected to the lower cover plate 347 at its rear end.

The hand member is reciprocably movable between an inner retracted position shown in FIG. 40 and an outer extended position shown in FIG. 41. For this purpose a link member 364 is suitably pivotally connected at one end to the inner end of hand member 346 and at its other end to the upstanding pin of a gear crank member 365 suitably journalled on bracket 363. Between this bracket and the gear 366 of the gear crank is a gear rack 368 having teeth meshing with the gear teeth. This gear rack is guided for fore-and-aft movement generally along the longitudinal axis of arm section 250 by a guide member in the form of a spring clip 369 suitably secured against vertical displacement on bracket 363. One end of this gear rack is connected to a pneumatic actuator 370 the opposite end of which is secured to pin 371 carried by bracket 348. The opposite end of gear rack 368 carries a vertical pin 372 extending above and below this rack. To the upper and lower ends of this cross pin are connected the ends of a pair of return springs 373, the opposite ends of which are suitably anchored to vertical pin 358.

The springs 373 normally pull gear rack 368 toward actuator 370 thereby rotating gear crank 365 in a counterclockwise direction as viewed in FIG. 42 and therefore retract link 364 and in turn hand 346. However, when pressurized air is introduced into actuator 370 gear rack 368 is driven rearwardly so as to rotate gear crank 365 in a clockwise direction as viewed in FIG. 42 against the urging of return springs 373 thereby to push link 364 forwardly and also the hand 346 to extend the latter from the free end of arm section 250.

One of the tubular guides 361 is slotted so that an air line (not shown) can extend from the open rear end of this guide tube forwardly and thence outwardly through the slot and connect with a nozzle 374 mounted in the semi-cylindrical wall portion 355 of hand recess 352. Whenever compressed air is admitted to actuator 370 compressed air is also supplied to nozzle 374 to blow metal chips and other debris off a tool holder portion 80 of a working tool T.

Referring to FIG. 40 which is a top plan view of hand 346 when arm section 250 is in an upper position, as compared with FIG. 41 which is a similar view but with the arm section in a lower position and showing the hand extended, it will be seen that finger 345 forming part of a finger member 375 can be moved between two positions about a pivotal axis which is provided by a vertical pin 376 for member 375. Finger 345 is arranged in an opening 377 in forwardly projecting hand 346. A compression spring 378 interposed between a stop pin 379 and a seat 380 on an abutment formed on finger member 375 always urges this member so as to protrude finger 345 as illustrated in FIG. 41 in which the finger may be regarded as in a closed condition extending circumferentially the generally circular contour of the inner curved configuration 355 of the hand recess 352. Visualizing a cylindrical part such as the section of tool holder 80 formed by groove 84, conforming generally to the circular shape of the semicircular recess portion 355, it will be seen that the closed finger 345 will prevent removal of the part arranged in the hand recess 352.

The opposite end of finger member 376 carries an upstanding actuating roller 381 rotatable about a vertical axis or an axis parallel to that of pivot 375. This actuating roller extends through a slot 382 provided in the upper wall of hand 346. Under the urging of finger spring 378 roller 381 bears against the end of slot 382 adjacent spring 378. In other words, the finger of member 375 is protrusile but the protruding finger 345 can be retracted by pushing on this roller toward the opposite end of this slot, as depicted in FIG. 40.

The means for so moving roller 381 from the position shown in FIG. 41 to that shown in FIG. 40 are responsive to the raising of the arm A. In other words, when arm A is in its upper position gripping finger 345 is withdrawn from hand recess 352 and hence is open but when the arm is in its lower position the finger extends into recess 352 and hence is closed.

The means for so moving the finger roller 381 transversely of hand 346 are illustrated in FIGS. 43 and 44. The bottom surface of the upper wall 252 of arm section 250 is provided with flats 383, 384 and 385 on which a slide plate 386 is movable in a horizontal plane. This slide plate has a cam surface 388 extending generally tangentially of finger actuating roller 381 and generally longitudinally of arm 250. Slide plate 386 is retained against the guide surfaces 383–385 on the arm by a fixed retainer plate 389. This retainer plate is fixed by a screw extending through a roller 390 in turn disposed in an inclined intermediate slot 391 provided in slide plate 386. This slide plate also has an outer inclined slideway 392 and an inner inclined slideway 393. Arranged in the outer slot 392 is another roller 394 rotatably mounted on a pin supported at opposite ends in retainer plate 389 and arm upper wall 252. A similar roller 395 is arranged in the inner slot 393 and is supported on a pin mounted at its ends also in the retainer plate and the arm upper wall.

The inner end of slide plate 386 is shown as formed with a pair of flanges or ears 396 which carry a transverse shaft 398 on which a roller 399 is arranged. This roller is adapted to be engaged by the lower end of the generally vertical arm 400 of a bell crank lever 401 which also has a generally horizontal arm 402. Intermediate these arms this lever is mounted on a horizontal pivot pin 403 carried by upstanding ears 404 formed at one end of the retainer bracket 334.

The generally horizontal arm 402 of this bell crank lever 401 is adapted to engage a sleeve 405 slidably arranged on arm lifter 332. This sleeve has an upwardly facing shoulder 406 adapted to engage the bottom surface of thrust washer 340.

It will be seen that when the arm section 250 moves vertically from the lower position shown in FIG. 37 to the upper position shown in FIG. 36, the bellcrank lever 401 through the sleeve member 405 thrustingly engages against thrust washer 340 forced downwardly against its stop 341 by counterbalance spring 339. This counterbalance spring is a relatively stiff spring because it supports substantially the weight of arm A and associated mounted parts including a typical working tool T arranged thereon. Accordingly, when the arm A is lifted the bell crank lever 401 rotates in a clockwise direction as viewed in FIG. 37 so as to cause this lever to push slide plate 386 outwardly and laterally due to the interengagement between the rollers 390, 394 and 395 and the guide slots 391, 392 and 393 and thereby cause outward and lateral movement of this slide plate as depicted in FIG. 43. Cam surface 388 on this slide plate acts against finger roller 381 to move it from the position shown in FIGS. 41 and 44 to the position shown in FIGS. 40 and 43 thereby causing withdrawal or retraction of gripping finger 345. A roller 252' mounted on arm top wall 252 for rotation about a vertical axis and arranged adjacent arm front wall 351 is adapted to be engaged by the adjacent side of hand 346 to react to the lateral thrust on this hand when finger roller 381 is displaced by slide plate 386.

In the event that the various parts are not adjusted properly, and raising arm A tends to cause an overtravel of sleeve 405 due to the fact that the transverse movement of the finger roller 381 can only be so far since it bottoms on the end of the hand slot 382, it will be seen that the upwardly facing shoulder 406 on this sleeve can lift thrust washer 340 off its retainer or stop 341 against the urging of counterbalance spring 339. Such a condition is depicted in FIG. 39 in which it will be noted that there is separation between thrust washer 340 and stop 341. Preferably, a bushing ring 408 is arranged on the upwardly facing shoulder of sleeve 405 so that in case rotative movement of this sleeve relative to stop 341 tends to occur, it is permitted by this ring.

It will be noted that hand 346 is urged upwardly against the downwardly facing guide surface of front arm wall 351 by springs 360. These springs hold the bottom of the saddleshaped guide member 356 slightly above the top surface of horizontal plate portion 350. Therefore if during raising of arm A hand 346 engages some obstruction, as when it is seating a working tool T in the spindle 8 as explained infra, some limited vertical yielding movement is permissible between this hand and arm.

Working Tool Storage and Selection Mechanism

Rack R is suitably supported at the outer end of a fixed arm 409 which is an integral part of housing H, this arm extending laterally and rearwardly from the outer side of casing side wall 264. This arm is shown as supporting an umbrella-like cover 410 having a depending annular shroud 411 open at one location indicated at 412 which provides a pickup location for a tool T when arm A is arranged adjacent rack R as shown in FIGS. 2, 49, 51 and 52. Arranged within cover 410 is a rack assembly comprising a lower disc-shaped mount plate 413, a ring bearing 414 arranged thereon, a ring-shaped drive rotor 415 arranged on this bearing, a ring-shaped driven rotor 416 arranged on this drive rotor, a ring-shaped cam plate 418 arranged on top of this driven rotor, and an upper mount plate 419.

Upper mount plate 419 bears against the lower end faces 420 of several depending posts 421 which are formed integrally with rack support arm 409. These end faces 420 are generally coplanar and horizontal. Upper mount plate 419 has elongated slots 422 the direction of which in a horizontal plane is inclined to the longitudinal axis of transfer arm section 250 when in its position adjacent rack R. Screws 423 extend upwardly through slots 422 and screw into internally threaded recesses provided in posts 421. When these fastening screws are loosened upper mount plate 419 is adjustable in the direction of elongation of slots 422 relative to transfer arm section 250, following which such screws can be retightened to maintain this plate in the desired adjusted position.

Lower mount plate 413 hangs from clamping screws 424 which extend vertically through holes in this lower plate and screw into threaded holes provided in upper plate 419. Adjacent each clamp screw is a leveling screw 425 the head of which is at its lower end and seated on an upwardly facing shoulder 426 formed by a counterbore in lower mount plate 413 and the upper threaded endportions of these leveling screws are received in threaded holes provided in upper mount plate 419. The narrower lower portion 428 of each counterbored hole provides an access opening to apply an adjusting tool to the head of the leveling screw 425. This lower mount plate 413 also is provided with access holes 429 which align vertically with the mounting screws 423 for upper plate 419.

It will be seen that by loosening clamping screws 424 the leveling screws 425 can be adjusted upwardly or downwardly following which the clamping screws can be retightened. In this manner the level of lower mount plate 413 can be adjusted for a purpose which will be apparent later.

Arranged on top of and secured to lower mount plate 413 and extending upwardly between posts 421 and into the hollow head of rack support arm 409, is an electric drive motor 430 having a vertical shaft 431 extending downwardly through a central hole 432 provided in this plate. To the lower end of this shaft is suitably non-rotatably secured one end of a horizontal drive arm 433 which extends radially outwardly below lower mount plate 413. The outer end of this drive arm extends slightly beyond the periphery of plate 413 and is semi-circularly recessed to receive the lower end of a vertical drive pin 434 which is suitably secured at its upper end to drive rotor 415. In this manner rotation of shaft 431 rotates rotor 415, this rotor being supported on bearing 414.

Driven rotor 416 preferably is a pan-shaped member formed of sheet metal having a flat bottom surface 435 engaging the upper flat surface 436 on drive rotor 415. The stack of driven rotor, drive rotor, and ring bearing are maintained against axial separation vertically and guided horizontally for rotation by a plurality of circumferentially spaced upstanding flanged hold-down rollers 438 which are mounted on lower mount plate 413, the flange of these rollers overlapping the top surface of driven rotor 416. Cam plate 418 is suitably fastened to the top of this driven rotor so as to rotate therewith.

Driven rotor 416 is rotatably driven by the frictional engagement between the opposing and contacting surfaces 435 and 436. The rotating drive arm 433 is preferably enclosed by a lower cover 439 secured to the underside of the driven rotor 416.

This driven rotor 416 is circular in outline and is shown as having a diameter substantially greater than that of either the lower mount plate 413 or the drive rotor 415. As stated, it is preferably made of sheet metal and to render it more stiff is shown as having an upturned annular flange 440 at its outer edge.

Driven rotor 416 is adapted to support a plurality of working tools T arranged severally at circumferentially spaced stations. Twenty-four such stations are provided for the tool rack illustrated, although any greater or smaller number can be provided. At each station, the floor of the pan-shaped driven rotor 416 is provided with a circular opening 441 having a keyway 442 at a predetermined location which is oriented with respect to its opening in the same relative position for each opening in the plurality of stations. Adjacent each opening is a pair of elongated rectangular openings 443 which are laterally spaced from each other with their long edges parallel to a radius for the circular opening 441. Adjacent the inner one of such rectangular openings 443, the driven rotor has struck out from the metal thereof an upstanding tab 444 which serves two purposes as will be explained infra.

Arranged in each circular opening 441 is a working tool socket member 445 which is a generally frusto-conical tubular member the lower end of which is externally formed with a pair of vertically spaced flanges 446 between which a key 448 extends adapted to be received in the keyway 442. The vertically spaced flanges 446 engage the upper and lower surfaces of driven rotor 416.

The upper end of each socket member 445 is shown as carrying a transverse pivot pin 449 for a latch member 450 which has a pair of ears 451 at its upper end which embrace the upper end portion of socket member 445 and receive the ends of pin 449. This latch member also includes a pair of generally vertical arms 452 severally extending through rectangular openings 443 and from the lower end of each arm extends a hook portion 453. These hook portions have upper horizontal edges 454 and at their outer ends or tips have lower inclined edges 455. Hooks 453 are adapted to enter the annular groove 84 in holder portion 80 of a working tool so that the upper edges 454 of these hooks engage the downwardly facing annular shoulder 84' in the tool holder and thereby support the tool in its socket member 445 as illustrated in FIG. 51.

Latch member 450 is urged to pivot so as to swing its hooked lower ends toward the center of the adjacent socket member 445 by a tension spring 456, one end of which is hooked to the upper end of the latch member laterally of its pivotal mounting and the other end of this spring is hooked to the upstanding tab or lug 444.

Figure 52:
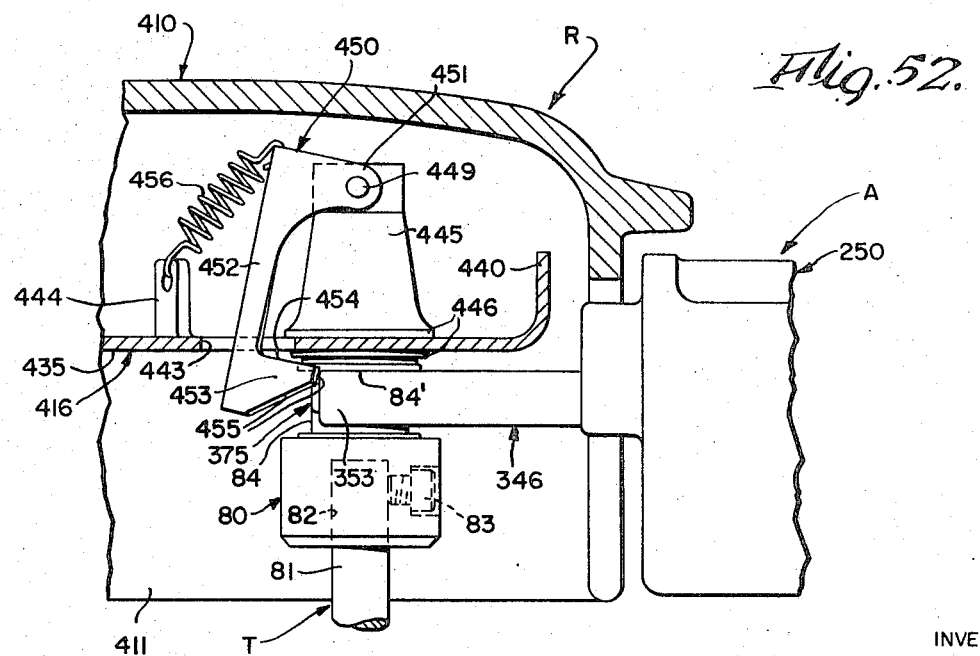
FIG. 52 is a view similar to FIG. 51 but showing the tool latch in an unlatched condition.

FIG. 52 illustrates how the fork-like extensions 353 and 354 of extended hand 346 are adapted to enter tool holder groove 84 and support the tool by the upper surfaces of extensions 353 and 354 engaging downwardly facing shoulder 84' on the tool. Upon these hand extensions 353 and 354 entering tool groove 84, latch member 450 is displaced as depicted in FIG. 52 to free the tool for downward removal from its rack socket.

Figure 49:
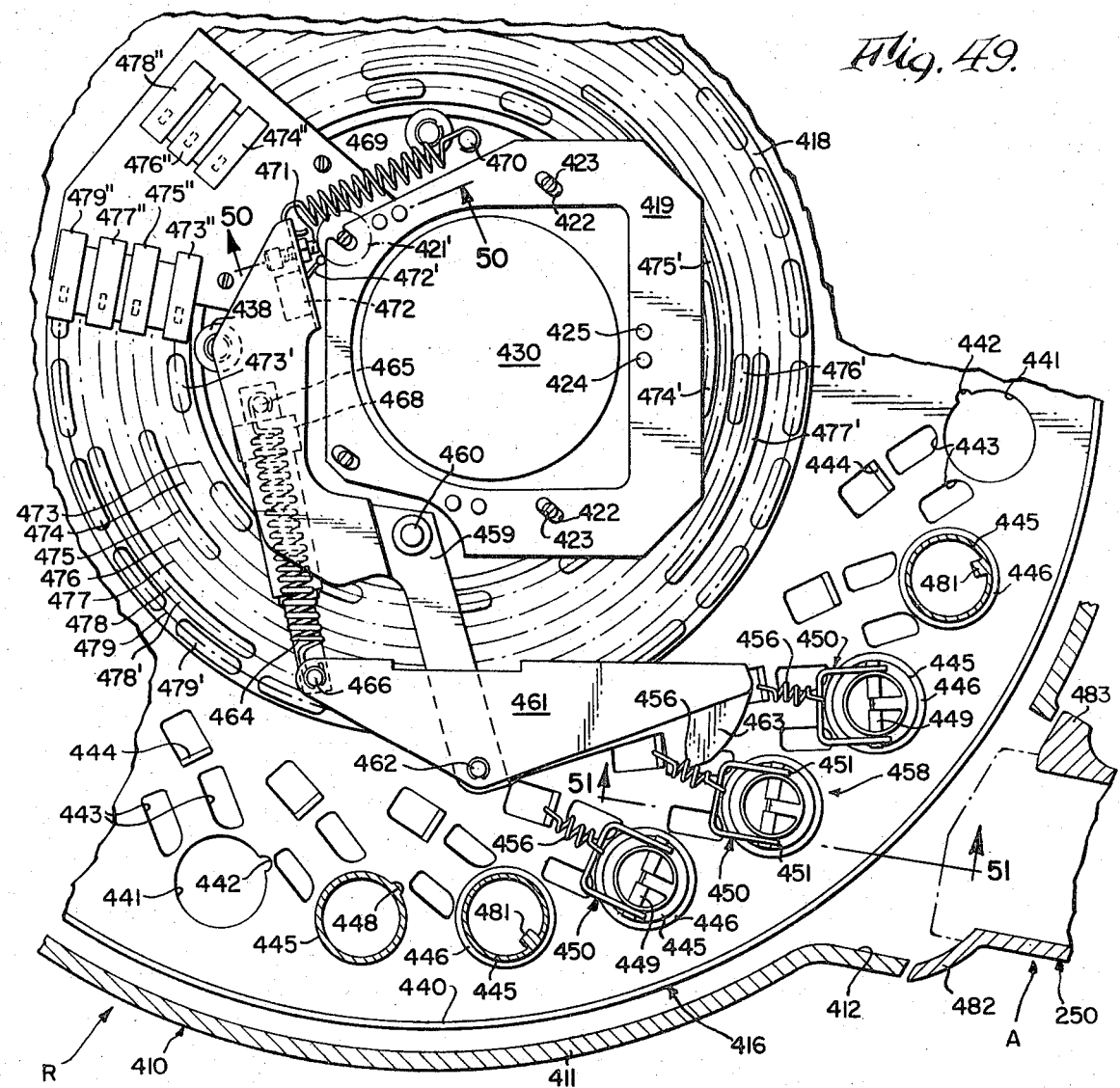
FIG. 49 is a fragmentary horizontal sectional view thereof taken generally on line 49—49, FIG. 48.
Figure 50:
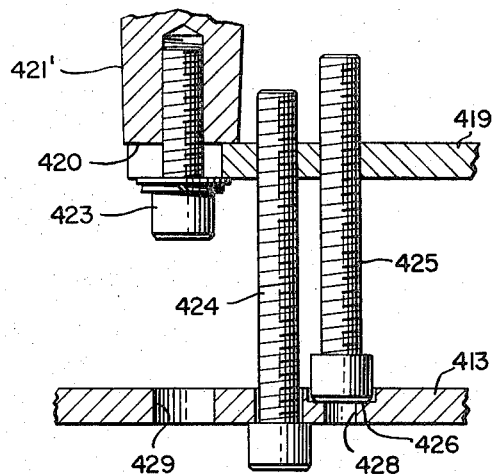
FIG. 50 is a fragmentary enlarged vertical sectional view through the tool rack assembly and part of its support structure and illustrating the adjustability of the rack mount, this view being taken on line 50—50 of FIG. 49.
Figure 51:
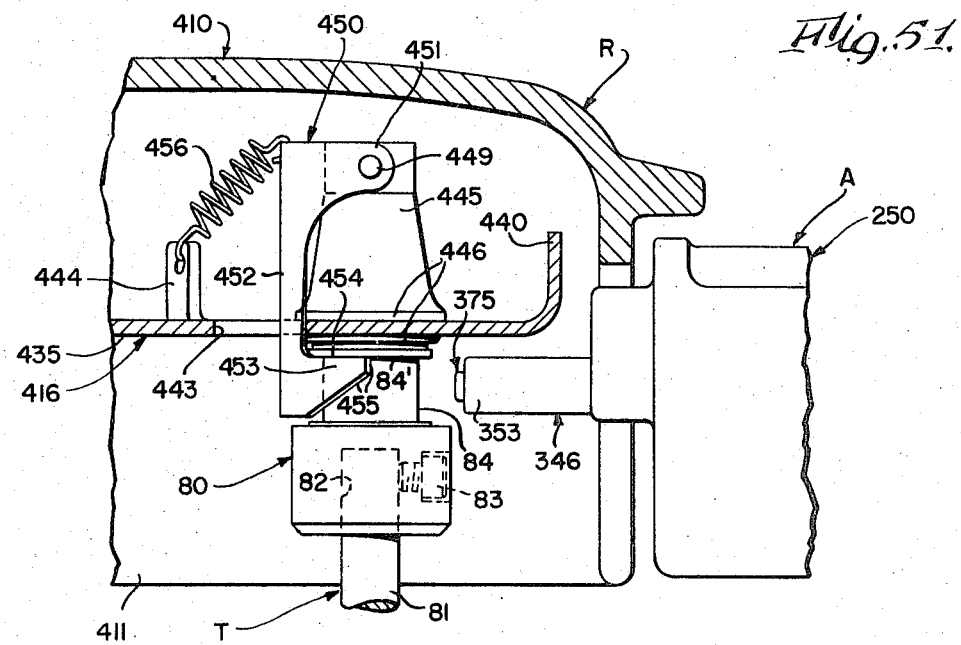
FIG. 51 is a fragmentary enlarged vertical sectional view of the tool rack, taken on line 51—51 of FIG. 49, and showing a tool latch in elevation and in a latched condition.

It will be seen that as driven rotor 416 is rotated by energization of rack motor 430 the various stations represented now by the tool socket members 455 move successively to a pickup location adjacent shroud side opening 412 indicated at 458 in FIG. 49 which is generally opposite the free end of the transfer arm section 250 as there shown and also illustrated in FIGS. 51 and 52.

Means are provided for stopping the desired tool station at pick-up location 458. Such means comprise hook means including a pivotal support member 459 pivotally mounted intermediate its ends on an upstanding pivot pin 460 carried by lower mount plate 413. A hook member 461 is pivotally mounted intermediate its ends on one end of said support member and extends generally transversely thereof. The pivot so mounting this hook member is a vertical pin 462 carried on one end of support member 459. At one end hook member 461 is formed with an outwardly extending hook 463. At its opposite end this hook member is connected by a spring 464 to an anchor post 465 mounted on lower mount plate 413. This spring adjacent the hook member engages a vertical pin 466 carried by hook member 461. To this pin is also connected one end of a pneumatic actuator 468, the other end of which is mounted on anchor pin 465.

Actuator 468 is arranged to push the tail end of hook member 461 and return spring 464 is arranged to pull this tail end. Thus spring 464 biases hook member 461 for pivotal movement relative to support member 459 about the axis of pin 462 in one direction, namely, in a clockwise direction as viewed in FIG. 49, to an engage-position in which hook 463 at the head end of such hook member is disposed in the path of the tabs or lugs 444 to engage one thereof, as depicted in this figure. Actuator 468 is arranged to pivot the hook member relative to the support member in the opposite direction, namely, in a counterclockwise direction, so that the hook 463 of the hook member is withdrawn from the path of the tabs or lugs to a disengage-position.

Means are provided for allowing some overtravel of hook member 461 when the same engages one of the upturned tabs or lugs 444 while driven rotor 416 is rotating. Such means include a spring 469 one end of which is connected to that end of hook support member 459 remote from the hook member 461, and the other end of this spring is secured to an anchor pin 470 carried by lower mount plate 413. Adjacent the end of hook support member 459 to which spring 469 is connected, this member supports an adjustable stop screw 471 one end of which is adapted to abut one of the stationary posts 421'. Also arranged on hook support member 459 adjacent this stop screw is a microswitch 472 having an actuating arm 472' adapted to engage post 421'.

Engagement of hook member 461 with one of the tabs or lugs 444 while the rack rotor 416 is rotating will likely cause pulling of hook support member 459 away from post 421' which acts as a stop therefor, against the urging of return spring 469. In other words, the end of stop pin 471 moves away from post 421'. This operation is detected by microswitch 472 which sets up a relay circuit. Such pivotal movement of hook support member 459 allows overtravel of rotor 416 until it decelerates to a stopped condition, following which now stretched return spring 469 becomes operative to pull this support member back toward post 421' so that stop pin 471 will reengage this post and again actuate microswitch 472 by engaging its trip arm 472'. The effect of this is to complete the aforementioned relay circuit and thereby indicate that the intended tool station has been stopped at pickup location 458.

Means are provided and arranged to control operation of the hook means. Such control means include the cam plate 418 which being secured to rack rotor 416 rotates therewith. This cam plate has on its upper surface a plurality of concentric circular cam tracks represented by the numerals 473, 474, 475, 476, 477, 478 and 479 in each of which are arranged lands 473', 474', 475', 476', 477', 478' and 479', respectively. These lands are curved along their respective tracks and of varying circumferential length and location since they are related according to a binary code to the number of tool stations. Overhead microswitch means 473'', 474'', 475'', 476'', 477'', 478'' and 479'' are operatively associated with the cam tracks 473–479, respectively, and with the pneumatic actuator 468 for retracting and releasing hook member 461.

More specifically, seven cam tracks are shown inasmuch as twenty-four tool stations are provided. While these tracks may be arranged in any suitably fashion, in the order radially outwardly, the innermost track 473 corresponds to number one, the next outer track 474 corresponds to the number eight, the next outer track 475 corresponds to the number two, the next outer track 476 corresponds to the number ten, the next outer track 477 corresponds to the number four, and the next outer track 478 corresponds to the number twenty, leaving the outermost track 479 as an enabling track in which a land 479' is arranged for every tool station.

Microswitches 473''–479'' cooperating with the lands 473'–479' are arranged in two radial banks, four in one bank servicing tracks 473, 475, 477 and 479, and three in another bank service tracks 474, 476 and 478. Twenty-four combinations of binary numbers and the numbers ten and twenty can be detected by the microswitches 473''–478'' and read when microswitch 479'' is actuated, to correspond to the twenty-four tool stations. Generally the intelligence produced by appropriate actuation of the various microswitches is utilized to match the command for a particular tool station so that when the command is satisfied by the corresponding tool station generally opposite the pickup location, a circuit involving the solenoid valve for actuator 468 is deenergized so as to allow return spring 464 to move the hook 463 on hook member 461 outwardly into the path of the tabs or lugs 444 and intercept the one adjacent the desired tool station.

Stop pin 471 is adjustable in order that the hook 463 of hook member 461 is in proper circumferential position relative to pickup location 458 so that when the hook engages one of the tabs or lugs 444, the adjacent tool station will be positioned circumferentially at the proper position for cooperation with the tool grasper G. Specifically, hand 346 must be able to embrace tool holder 80 at groove 84.

In this connection, the wall of hand 346 at the bottom of semi-circular recess portion 355 carries a fixed taper-nosed radial indexing pin 480 adapted to enter indexing recess 85 in tool holder 80. This orients this tool holder relative to the hand so that when the hand is later extended and presents to the spindle a tool taken from the rack, key 89 is aligned for entry with keyway 86. In order to orient properly each tool while supported on rack rotor 416, each tool socket 445 has a key 481 on its inner wall surface which aligns and receives keyway 86 on the tool. Thus each tool T is oriented at its station on rack R and is oriented relative to hand 346 when picked up thereby and is oriented relative to spindle 8 when presented thereto or removed therefrom.

Preferably the free or outer end of transfer arm section 250 has laterally extending flange portions 482 and 483 arranged to close opening 412 in rack cover 410. This prevents chips generated at the work site from entering this opening and collecting on the rack rotor.

OPERATION

Figure 53:
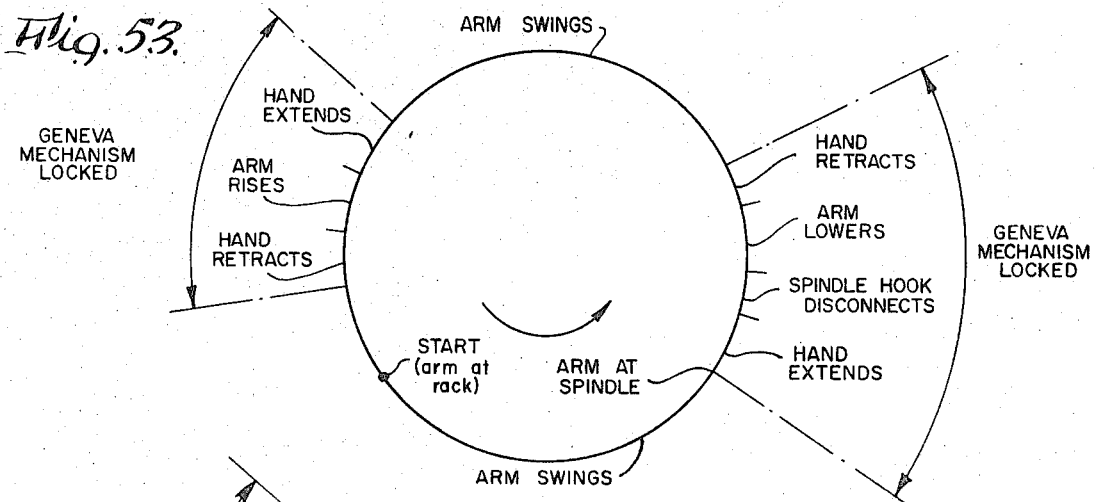
FIG. 53 is a diagram representing the functions performed during counterclockwise rotation as viewed in FIG. 32 of a combined crank and cam member controlling the rotational and translational drive for the tool transfer arm.
Figure 54:
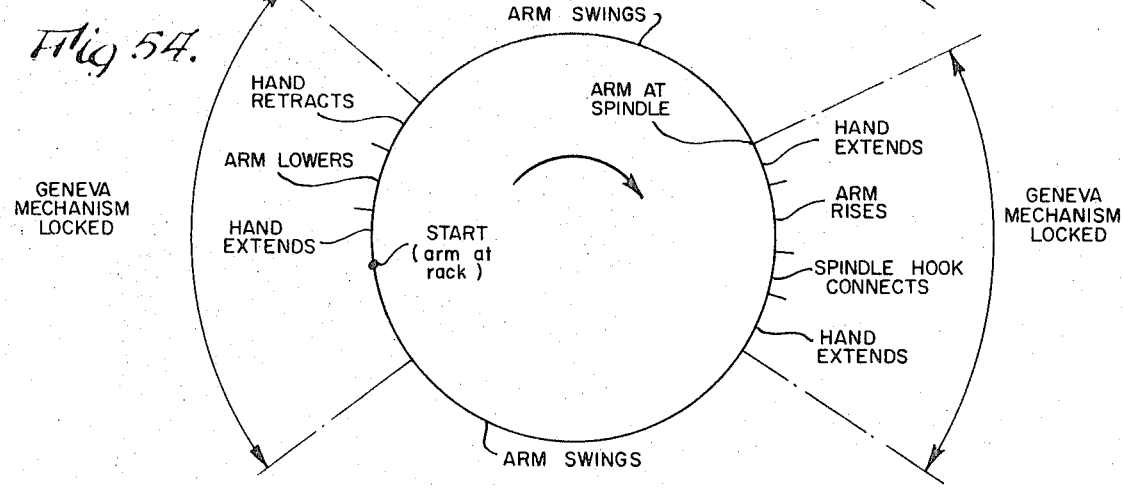
FIG. 54 is a diagram similar to FIG. 53 but showing the functions performed during reverse or clockwise rotation of said member.
Figure 55:
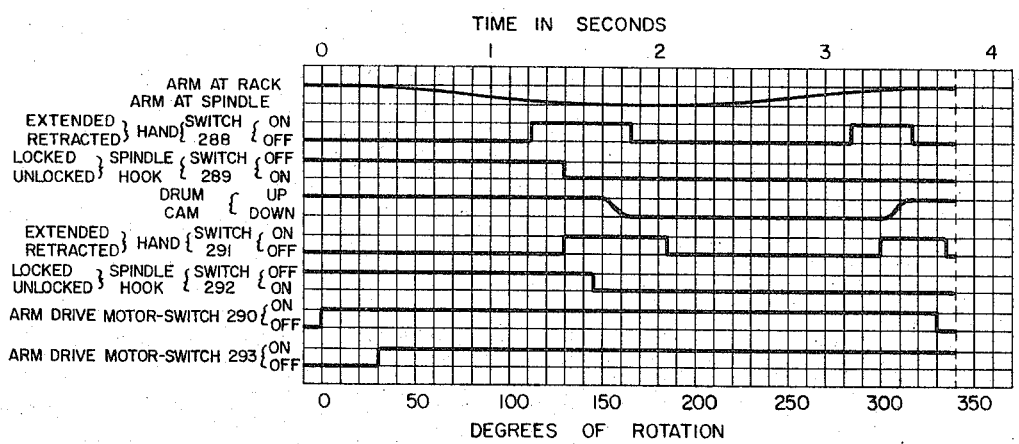
FIG. 55 is a timing diagram representing principally the functions of various switches shown in FIGS. 33 and 33A which control the operation of certain mechanisms when the tool changer is in operation.

The operation of the tool changer is depicted sequentially and schematically in figs. 56 to 75 and is diagrammatically represented in the circular diagrams shown in FIGS. 53 and 54 and in the longitudinal timing diagram shown in FIG. 55.

In commencing an explanation of the operation, it is to be understood that a supply of compressed air is available to operate the various pneumatic actuators, and a supply of pressurized fluid such as oil is available to operate the hydraulic actuator. It is further assumed that the machine tool is tape controlled and is operating under that mode.

An automatic mode tool change signal is read after spindle 8 leaves its top position to follow a command. Mounted on this spindle is a working tool T which performs a machining operation at the end of which the spindle returns to its uppermost position. This return to the top position of the spindle, indicating performance of its previously commanded work, is detected by microswitch 13. Actuation of this switch does a number of things, including deenergizing the spindle drive motor 9, energizing the solenoid controlling the supply of compressed air to actuator 65 so as to apply the spindle brake, and commands table 15 to move along the X—X axis to provide access to the lower end of spindle 8 for effecting the tool change.

As the drive motor shaft 20 slows down, the centrifugal device 66 becomes operative when a predetermined low speed is achieved and this is detected by actuation of microswitch 68. This switch actuation operates to deenergize the solenoid supplying compressed air to brake actuator 65 and thereby releases the brake, energizes the back gear shifter motor 42 to move shaft 40 to the position which places the backgear assembly in neutral, energizes the solenoid supplying compressed air to actuator 162 which extends to pivot the drawbar plate assembly 148, 166 toward a position in which the spindle yoke 124 and drawbar yoke 128 will be engaged by their respective forks 153' and 189. This brings drive gears 149 into engagement with teeth 135 of drawbar nut 131. Such pivotal movement of the assembly also causes pawl member 234 to follow its movement, thereby moving this pawl member away from microswitch 249. This is detected by this microswitch to cause energization of the drawbar motor 212 to rotate the spindle slowly through the driving engagement of the gears 149 with the drawbar nut 131 in a direction that tends to loosen this nut but this loosening cannot occur because it is jammed against spindle yoke 124. This direction of drive is called reverse drive.

When the pawl tooth 235 drops into its spindle pawl recess 120, this is detected by the tail of the pawl member tripping microswitch 245. Such operation of this microswitch deenergizes drawbar motor 212 to stop the reverse spindle drive; energizes lower coil 193 of the 4-way solenoid valve 191 to cause the admission of pressurized hydraulic fluid to chamber 181 of actuator 168 and thereby exert an upward pull at a high force level on the drawbar 108 to relieve the jam between the drawbar nut 131 and the spindle yoke 124; and energizes the drawbar motor 212 to rotate now at high speed in the same reverse direction so as to loosen or back off the drawbar nut which continues until the pins 130 and 132 on this nut and the drawbar yoke overlap to prevent further relative rotation which causes clutch 214 to slip and thereby lift switch plate 229 and actuate microswitch 233.

Such actuation of this microswitch 233 energizes the motor 268 on the gear housing to rotate the rotary member 271 with which the geneva mechanism 259 and the arm lifter 332 are operatively associated. Also, rotation of this rotary member 271 operates to rotate the six switch cam discs 274–279 which in turn control the operation of their respective microswitches 288–293. The control of these microswitches is depicted in the timing diagram in FIG. 55. At this time rotary member 271 is rotating in a counterclockwise direction as viewed in FIG. 32 and depicted in the diagram in FIG. 53. Referring to these diagram figures, it will be seen that the forepart of such rotary motion operates the geneva mechanism to cause the transfer arm A to pivot from its parked position shown in FIG. 2 in a counterclockwise direction as viewed in this figure and as may also be visualized from FIGS. 32 and 33. This swing of arm A is through an angle of about 163°, terminating in a position pointing this arm at the spindle 8.

Referring to FIG. 55 and comparing the same with FIG. 53, it will be seen that during counterclockwise rotation of rotary member 271 switch 288 when on controls extension of the grasper hand; switch 289 when on controls disconnection of the working tool from the spindle; and switch 290 when on controls energization of motor 268 and the counterclockwise rotative drive on member 271.

At the end of the arm swing toward the spindle, switch 288 controlling extension of the hand is energized so that the hand extends to embrace the working tool still mounted in the spindle. Thereafter, the upper solenoid coil 194 of the 4-way solenoid valve is energized by switch 289 and at the same time deenergizes the lower coil 193 of this valve, thereby to cause the drawbar to be pushed downwardly and effect a disconnection of spindle hook 91 and tool hook 90.

Following this the transfer arm is lowered by the drum cam profile 344 which automatically causes a gripping or closing around on the tool by the gripping finger 345 to occur automatically.

When the transfer arm reaches its lower position, the hand is retracted by switch 288 turning off, following which the arm is rotated back from the spindle position toward the rack position by reversed operation of the geneva mechanism. When reaching the rack position switch 288 is again turned on to extend the hand with the tool still mounted thereon. The arm is raised to insert the tapered upper end of the tool into the vacant tool socket assigned for this particular tool and which socket is waiting at the pick-up station 458. The raising up of the tool causes the latch 450 to pivot out of the way. The tool enters into its socket and the gripping finger is opened.

At the end of such arm raising of the extended hand, switch 288 is turned off which operates to retract the hand into the transfer arm after which rotation of the rotary member stops by turning off switch 290 effecting deenergization of motor 268.

Turning off this motor 268 which stops rotation of the rotary member causes energization of the solenoid for supplying compressed air to the rack hook actuator 468 thereby activating this actuator to retract hook 463. This frees rack rotor 416 for rotation. At the same time the rack drive motor 430 is energized to turn drive rotor 415 and turn rotor 416. This begins to turn and continues to do so until the microswitches 473''–479'' over cam plate 418 detect that the next tool commanded to be placed on the spindle has arrived at the pick-up location 458 whereupon the solenoid servicing the hook actuator 468 is deenergized causing release of this hook actuator and an outward swing of the hook 463 into an engage-position. At the same time, energization of the rack drive motor 430 is discontinued.

However, the momentum of the rotating elements of the rack causes continued rotation of these elements, even after the hook 463 has engaged the appropriate tab or lug 444. Such engagement pulls stop screw 471 off post 421', this being detected by microswitch 472. The rotation of the rack decelerates and finally stops and under the urging of return spring 469 the rack rotor 416 reverses or retrogresses until stop screw 471 reenegages post 421' which is detected by microswitch 472.

This last detection starts energization of the gear housing motor 268 to reverse its drive and begin the reverse cycle of operation depicted in the diagram shown in FIG. 54. Now the rotary member 271 rotates in a clockwise direction.

Referring to FIG. 55 and comparing the same with FIG. 54, it will be seen that during clockwise rotation of rotary member 271, switch 291 controls extension of the grasper hand; switch 292 when on controls connection of a working tool to the spindle; and switch 293 when on controls energization of motor 268 and the clockwise rotative drive on member 271.

Thus at the commencement of the clockwise drive, the transfer arm is in its up position and switch 291 is turned on to extend the hand to embrace the new tool to be picked up at location 458. In so embracing the new tool the retaining latch 450 is cammed out of the way. Following this, the transfer arm is lowered to clear the tools left in the rack, this being effected by the drum cam causing closing of the gripping finger. Thereafter the hand retracts when switch 291 is turned off.

The arm then swings toward the spindle by actuation of the geneva motion mechanism, the arm stopping under the spindle. At this point switch 291 is turned on again to extend the hand.

Next, the arm rises because of the drum cam, causing an opening of the gripping finger as the tool is moved axially upward of the spindle. Switch 292 energizes the coil 206 of the 2-way solenoid valve 200 and the lower coil 193 of the 4-way solenoid valve 191 and energizes the drawbar motor 212. The drawbar actuator 168 pulls on the drawbar 108 with the lower level of force, thereby connecting the new tool to the spindle. Motor 212 drives the drawbar nut in a tightening direction and this continues until detected by the clutch 214 slipping causing operation of microswitch 233.

If the backgear had been disengaged the drawbar motor 212 drives the spindle to turn it for gear reengagement. The gear shifter mechanism 41 shifts the back gear into the next desired position, high or low, as command requires. Engagement of the gears is detected by the microswitches 52, 54, 56 associated with the gear shifter mechanism, causing the drawbar mechanism to pivot by deactivating actuator 162 and disengage the forks 189 and 153' from the yokes 128 and 124. This also retracts the pawl tooth from the spindle pawl recess, all detected by pawl engaging microswitch 249.

As soon as the new tool has been locked into the spindle, the hand is withdrawn by turning off switch 291 and the tool arm while up swings back due to operation of the geneva mechanism to the park position adjacent the rack. When the transfer arm reaches the park position, the tape may start positioning table 15 along the X—X axis to a new point. Once the gear shifter shows that the gears are engaged and the drawbar mechanism has withdrawn, the spindle speed changer may bring the spindle to its new speed by operation of motor 29.

What is claimed is:

1. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said rack including a plate having an opening at each of said tool stations, an annular socket member secured at one end to said plate and surrounding each such opening to provide a socket for a working tool, an index key on the inside of said socket member arranged to be received in an index keyway in a working tool when inserted in said socket, and latch means arranged adjacent said socket member for releasably supporting a working tool therein and including a transverse pivot pin mounted on said socket member at the other end thereof, a hook-shaped latch pivotally supported on said pin and spring means operatively arranged between said plate and latch, said plate having an opening through which said latch extends.

2. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said rack having a flat bottom surface, and said rack mounting means including a mount member, an anti-friction ring bearing on said mount member, a drive rotor supported on said bearing and having a flat upper surface frictionally engaging said bottom surface, means carried by said mount member for guiding said rack and rotor during rotation, means carried by said mount member for preventing separation of the stack comprised of said bearing, rotor and rack and means for rotating said drive rotor.

3. A machine tool according to claim 2 wherein said rotating means include a motor mounted on said mount member thereabove having a shaft extending downwardly through an opening in said mount plate and a drive arm fast at one end to said shaft below said mount plate and connected at its other end to said rotor.

4. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, and means for indexing rotation of said rack to position selectively any of said tool stations at a predetermined pickup location, including a lug on said rack adjacent each of said tool stations, hook means adapted to engage any one of such lugs to stop rotation of said rack and means arranged to control operation of said hook means.

5. A machine tool according to claim 4 wherein said hook means include a pivotal support member, a stop, return spring means biasing pivotal movement of said support member toward a position against said stop, a hook member pivotally mounted on said support member, spring means biasing pivotal movement of said hook member relative to said support member in one direction to an engage-position in which said hook member is disposed in the path of said lugs to engage one thereof and actuator means arranged to pivot said hook member relative to said support member in the opposite direction to a disengage-position in which said hook member is withdrawn from said path, engagement of said hook member with one of said lugs while said rack is rotating pulling said support member away from said stop against the urging of said return spring means to cause decelerating overtravel of said rack following which said return spring means becomes operative to return said support member to engagement with said stop thereby also to reverse rotation of said rack to position one of said tool stations at said pickup location.

6. A machine tool according to claim 5 wherein the position of said support member relative to said stop when engaging the same is adjustable whereby said pickup location is adjustable relative to said first angular position of said arm.

7. A machine tool according to claim 5 wherein said control means include a cam plate arranged for rotation with said rack and having a plurality of cam tracks arranged according to a binary code related to the number of said tool stations and microswitch means operatively associated with said cam tracks and said actuator means.

8. A machine tool according to claim 4 wherein said control means include a cam plate on said rack having a plurality of cam tracks arranged according to a binary code related to the number of said tool stations and microswitch means operatively associated with said cam tracks and said hook means.

9. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said rack mounting means including a frame member having posts the end faces of which are generally coplanar and generally perpendicular to the pivotal axis of said rack, an adjust plate arranged against said end faces and having elongated slots the direction of which in a plane generally parallel to said end faces is inclined to the longitudinal axis of said arm when in said first angular position and fasteners extending through said slots for securing said adjust plate to said posts, whereby with said fasteners loosened said adjust plate is adjustable in said direction relative to said arm following which said fasteners can be retightened to maintain said adjust plate in the desired adjusted position.

10. A machine tool according to claim 9 wherein said rack mounting means further include a mount plate spaced from said adjust plate and having holes, adjustable leveling screws carried by said adjust plate abuttingly engaging said mount plate and clamping screws carried by said adjust plate and extending through said holes for clamping said mount plate against said leveling screws, said mount plate having access holes aligned severally with said leveling screws, whereby with said clamping screws loosened said leveling screws can be adjusted to level said mount plate following which said clamping screws can be retightened to maintain said mount plate in the desired adjusted position.

11. A machine tool according to claim 10 wherein said mount plate has further access holes aligned severally with said fasteners, whereby removing said fasteners permits removal of the rack assembly from said frame member without disturbing the level adjustment of said mount plate relative to said adjust plate.

12. A machine tool according to claim 11, further comprising means for indexing rotation of said rack to position selectively any of said tool stations at a predetermined pickup location adjacent the end of said arm when in said first angular position, including a lug on said rack adjacent each of said tool stations, and hook means adapted to engage any one of such lugs to stop rotation of said rack including a hook support lever pivotally mounted intermediate its ends on said mount plate, an adjustable stop screw carried by said hook support lever at one end thereof and adapted to engage one of said posts, spring means operatively interposed between said mount plate and said one end of said hook support lever for urging said stop screw against said post, a hook lever pivotally mounted intermediate its ends on the other end of said hook support lever and having a hook at one end, spring means operatively interposed between said mount plate and the other end of said hook lever for biasing pivotal movement thereof relative to said hook support lever in one direction to an engage-position in which said hook is disposed in the path of said lugs to engage one thereof and actuator means operatively interposed between said mount plate and said other end of said hook lever for pivoting said hook lever relative to said hook support lever in the opposite direction to a disengage-position in which said hook is withdrawn from said path.

13. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said grasper including a hand member having a recess adapted to embrace partially a working tool, means for guiding said hand member during said extension and retraction, means for extending said hand member, means for retracting said hand member, and means mounting said hand member on said transfer arm for limited yielding movement relative thereto in a direction transverse of said transfer arm and generally parallel to said axes.

14. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said grasper including a hand member having a recess adapted to embrace partially a working tool, means for guiding said hand member during said extension and retraction, means for extending said hand member and means for retracting said hand member, said extension means including gear crank means, link means operatively interposed between said hand member and gear crank means, gear rack means operatively engaging said gear crank means and actuator means for moving said gear rack means.

15. A machine tool according to claim 14 wherein said retracting means includes return spring means operative upon deactivation of said extension means to retract said hand member.

16. A machine tool according to claim 13 wherein said mounting means for said hand member include a movable bracket slidably supporting said hand member and spring means yieldingly supporting said bracket.

17. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said grasper including a hand member having a recess adapted to embrace partially a working tool, means for guiding said hand member during said extension and retraction, means for extending said hand member, means for retracting said hand member, and means for delivering a blast of compressed air outwardly from the wall of said hand member defining said recess and directed generally toward the center of said recess.

18. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, and a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said first axial position of said transfer arm being an upper position and said second axial position of said transfer arm being a lower position, said grasper including a hand member having a generally semi-circular recess adapted to embrace a working tool, a finger member pivotally mounted on said hand member including a protrusible finger arranged when protruded to continue circumferentially the generally circular shape of said recess to provide a prehensile grip, spring means constantly urging said finger to such protruded condition and means responsive to translation of said arm from said lower position to said upper position for pivoting said finger member so as to withdraw said finger from said protruded condition.

19. A machine tool according to claim 18 wherein said responsive means include a slide guided for movement on said arm having a cam surface engageable with said finger member to pivot the same against the urging of said spring means, a lever pivotally mounted on said arm and arranged to move operatively said slide and means for operatively pivoting said lever when said arm rises toward its said upper position.

20. A machine tool according to claim 19 wherein said finger member includes an actuating roller having an axis generally parallel to the pivotal axis of said finger member, said slide is a plate extending generally tangentially of said roller and has at least two slots therein, said arm has guide surfaces thereon for said slide, a retainer plate for said slide, means securing said retainer plate to said arm and extending through one of said slots, cam roller means mounted on said arm and retainer plate and including a cam roller arranged in the other of said slots, camming engagement between said cam roller and the wall edge of said other of said slots causing lateral displacement of said actuating roller and hence pivotal movement of said finger member.

21. A machine tool according to claim 20 wherein said lever pivoting means include a stop, a thrust element seated on said stop and additional spring means urging said thrust element against said stop, and said lever is a bell crank having a push arm arranged to push said slide and an actuating arm arranged for thrust engagement with said thrust element when said transfer arm rises toward its said upper position to cause pivotal movement of said bell crank.

22. A machine tool according to claim 19 wherein said finger member includes an actuating roller projecting through a slot in said hand member and movable in a direction generally transverse of said transfer arm within the limits permitted by the ends of said slot, said slide is movable longitudinally and laterally relative to said transfer arm, and said cam surface extends generally longitudinally of said transfer arm and engages said actuating roller.

23. A machine tool according to claim 22, further comprising anti-friction thrust means operatively interposed between said transfer arm and hand member and arranged on the side of said actuating roller opposite from said cam surface.

24. A machine tool according to claim 22 wherein said lever pivoting means include a stop, a thrust element seated on said stop and adapted to be thrusted toward an unseated condition by said lever and additional spring means urging said thrust element toward said seat.

25. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, and means for pivoting said arm between said angular positions including drive motor means, rotary crank means driven by said motor means, geneva motion means, link means operatively interposed between said crank means and geneva motion means and step-up gear means operatively interposed between said geneva motion means and said arm.

26. A machine tool according to claim 25 wherein said arm rotating means further includes slip clutch means operatively interposed between said drive motor means and said crank means.

27. A machine tool according to claim 25 wherein said geneva motion means include a rotative drive member pivotally connected to said link means and having a drive pin, a rotative driven member having a groove arranged to receive said drive pin and means for locking said driven member against rotation at the extremes of the intermittent movement permitted by said geneva motion means to allow further rotation of said drive member.

28. A machine tool according to claim 27 wherein said link means include a link pivotally connected at one end to said geneva drive member and at its other end to said crank means and means for adjusting the effective length of said link whereby the rotative position of said crank means can be adjusted relative to said geneva drive member.

29. A machine tool according to claim 28 wherein said geneva drive member carries a link pin, and said link means further include an eccentric bushing rotatively mounted on said link and receiving said link pin and means for maintaining the adjusted rotative position of said bushing relative to said link.

30. A machine tool according to claim 25 wherein said drive pin is adapted to enter and leave said groove, and said locking means include a pair of locking pins on said driven member and a pair of locking grooves in said drive member severally adapted to receive said locking pins, one such locking pin and groove engaging at the end of travel of said driven member in one rotational direction and the other such locking pin and groove engaging at the end of travel of said driven member in the opposite rotational direction.

31. A machine tool according to claim 30 wherein each of said locking pins has an eccentric mounting portion rotatably received in a recess in said driven member and clamp means holds the adjusted angular position of each said mounting portion relative to said driven member, whereby properly aligned engagement between each such locking pin and its locking groove is attainable.

32. A machine tool according to claim 25 wherein said geneva motion means includes a rotative driven member, and said step-up gear means include a drive gear fast to said driven member for coaxial rotation therewith and a driven gear fast to said arm and meshing with said drive gear and having a pitch diameter smaller than that of said drive gear.

33. A machine tool according to claim 32, further comprising eccentric means mounting said driven grear thereby to permit adjustment of the mesh of said driven gear with said drive gear.

34. A machine tool according to claim 33 wherein said pivotal mounting means for said arm includes an elongated pivot member, said eccentric means include an eccentric end portion on said pivot member and means arranged to fix said pivot member in the desired adjusted angular position relative to a fixed support and also to fix said pivot member against longitudinal movement relative to said support, said arm being arranged for longitudinal movement on said pivot member to provide the axial translation of said arm.

35. A machine tool according to claim 32, further comprising means for permitting angular adjustment while maintaining coaxial alignment between said driven gear and arm thereby to adjust said second angular position of said arm to align with said spindle.

36. A machine tool according to claim 35, wherein said adjusting means includes a cylindrical end on said driven gear received in a cylindrical recess in the hub end of said arm, said cylindrical end and recess having opposing end faces, a lug projecting from said end face on said driven gear and received in an enlarged cavity in said hub recessed from said end face thereof, chordal adjusting screws carried by said hub on opposite sides of said lug and adapted to bear thereagainst and fasteners threaded into said end face of said driven gear and extending through enlarged slots in said end face of said hub.

37. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, and means for translating said arm including drive motor means, rotary cam means driven by said motor means, arm lifter means, and lever means operatively interposed between said cam means and lifter means.

38. A machine tool according to claim 37 wherein said arm translating means further includes slip clutch means operatively interposed between said drive motor means and said cam means.

39. A machine tool according to claim 37 wherein said arm lifter means further includes counterbalance spring means substantially counterbalancing the weight of said arm.

40. A machine tool according to claim 37 wherein said cam means includes a cam surface having throw in a direction generally parallel to the axis of rotation of said cam means, said lever means include a lever and means mounting said lever intermediate its ends for pivotal movement about an axis extending transversely of such cam axis, said arm lifter means includes an arm lifter, means securing one end of said arm lifter to said arm, means pivotally connecting the other end of said arm lifter to one end of said lever, and cam follower means on the other end of said lever arranged operatively to follow said cam surface.

41. A machine tool according to claim 40 wherein said arm lifter means further includes a clevis member arranged at said other end of said arm lifter and threadedly connected thereto whereby relative rotative movement therebetween adjusts the effective length of said arm lifter means and means for maintaining the adjusted rotative position between said clevis member and arm lifter, said securing means allows relative rotation between said arm and arm lifter, and said pivotally connected means pivotally connects said clevis member to said one end of said lever.

42. A machine tool according to claim 41 wherein said maintaining means includes a jam nut, and said arm lifter means further comprises counterbalance spring means including a helical compression spring surrounding said arm lifter and at one end bearing against said nut and operative to balance substantially the weight of said arm.

43. A machine tool according to claim 42, further comprising pivotal mounting means for said arm including a tubular pivot surrounding said counterbalance spring, and said counterbalance spring means further includes means mounted on said pivot for supporting the other end of said spring.

44. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, and means for rotating and translating said arm including drive motor means, rotary means driven by said drive motor means, and slip clutch means operatively interposed between said drive motor means and said rotary means, said drive motor means including a drive shaft, said rotary means including a rotary member, and said clutch means including a plurality of switch cam discs rotatable with said member, a plurality of friction discs rotatable with said shaft and alternately arranged between and contacting said cam discs and means for forcing the opposing faces of said cam discs and friction discs against each other to provide an slippable frictional drive therebetween.

45. A machine tool according to claim 44 wherein said rotary member has an end face provided with circumferentially spaced internally threaded recesses the axes of which are generally parallel to the rotational axis of said member, and said clutch means further include studs severally screwed in said recesses and having externally threaded remote ends, a thrust plate mounted on said studs adjacent said end face, a pressure plate mounted on said studs adjacent said remote ends thereof, a nut on such threaded remote end of each of said studs and belleville spring means operatively arranged on each of said studs between its said nut and said pressure plate, said cam discs being mounted on said studs.

46. A machine tool according to claim 45 wherein the periphery of each of said cam discs is contoured to provide a timing cam surface, and further comprising stationary microswitch means for each of said cam discs and operatively associated with its said cam surface, whereby rotation of said cam discs with said rotary member controls operation of the various microswitch means.

47. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only single working tool and removing a working tool from said spindle and returning it to said rack before said rack is rotated to present another working tool to said arm for pickup thereby and transfer to said spindle, said spindle being tubular and having at one end an internally tapered tool-receiving end section, each of said working tools having an externally tapered spindle-insertable end portion adapted to be inserted into and seated on said tapered section and being further formed on the end face of said insertable end portion with a hook recess the mouth of which is formed by an inturned annular lip to provide a tool hook, means slidable in said spindle including a spindle hook adapted releasably to lockingly engage said tool hook, and means arranged to move said spindle hook into and out of locking engagement with said tool hook when said hooks are overlapped, said slidable means including a slide member and a plurality of circumferentially spaced fingers projecting axially from said slide member, the free end of each of said fingers being radially movable and formed to provide an external hook, all such external hooks collectively providing said spindle hook which is radially expandable and contractable, and cam means for moving said fingers radially in and out, said spindle hook when contracted being insertable through said mouth into hook recess past said lip by axial movement of said slide member in a direction toward said end portion and when in such relative axial position being expandable into locked engagement with said lip.

48. A machine tool according to claim 47 wherein the free ends of said fingers are radially contractile, and said cam means include cam surfaces severally on the radially inner sides of said fingers at said free ends thereof and a cam mounted on said spindle within the cluster of said fingers and engageable with said cam surfaces.

49. A machine tool according to claim 48 wherein said cam means further include a sleeve mounted on said spindle and radial struts severally extending in the spaces between adjacent pairs of said fingers, said struts at their outer radial ends being connected to said sleeve and at their inner radial ends being connected to said cam.

50. A machine tool according to claim 49, further comprising a tool ejector member slidably mounted on said sleeve and having slots receiving said struts and pushed against said end portion by said slide member when axially moved in said direction.

51. A machine tool according to claim 47, further comprising tool ejection means responsive to said axial movement of said slide member in said direction for ejecting said inserted working tool upon disengagement of said spindle and tool hooks.

52. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, said spindle being tubular, means for axially holding a working tool in said spindle, and means for releasing such axial hold on said working tool, said tool holding means including a drawbar arranged within said spindle and having one end operatively associated with said working tool and its opposite end extending from said spindle and having a threaded section and a nut arranged on said threaded section in a tightened thrusting engagement against the end of said spindle so as to axially load said drawbar, and said tool hold releasing means including means for holding said spindle against axial displacement, means for pulling said drawbar while said spindle is held against axial displacement to relieve said thrusting engagement, means for rotating said nut to move it axially along said threaded section away from said spindle and thereby loosen it and means for pushing said drawbar toward said working tool.

53. A machine tool according to claim 52 wherein said thrust relieving means is operative to pull said drawbar with one level of force to facilitate loosening nut rotation, said nut rotating means is reversible for retightening said nut from a loosened condition, and further comprising additional means operative to pull said drawbar with a level of force lower than said one level during retightening nut rotation.

54. A machine tool according to claim 53 wherein said spindle holding means includes spindle yoke means fast to said spindle and spindle fork means releasably operatively associated with said spindle yoke means, said thrust relieving means includes drawbar yoke means fast to said drawbar, drawbar fork means releasably operatively associated with said drawbar yoke means and said nut is arranged between said spindle yoke means and said drawbar yoke means.

55. A machine tool according to claim 54 wherein during loosening rotation of said nut it moves axially toward said drawbar yoke means, and further comprising means for limiting the axial approach of said nut toward said drawbar yoke means to prevent axial jamming therebetween.

56. A machine tool according to claim 54 wherein said thrust relieving means include a first pivot member and a fluid operated actuator mounted on said first pivot member and operatively connected to said drawbar fork means, said nut rotating means including gear teeth on said nut, a pair of gear shafts on opposite sides of said drawbar and tiltable toward and away from each other severally in planes radial with respect to the longitudinal axis of said drawbar, a drive gear fast to each of said gear shafts adapted to mesh with said nut gear teeth, means constantly biasing said gear shafts toward each other, cam means for tilting said gear shafts away from each other including a second pivot member having a cam surface for each gear shaft, said spindle fork means being arranged on said second pivot member, means mounting said pivot members for pivotal movement together about an axis extending generally parallel to said longitudinal axis of said drawbar, means for pivoting said pivot members in one direction to engage said spindle fork means with said spindle yoke, to engage said drawbar fork means with said drawbar yoke and to allow said gear shafts to move toward each other under the urging of said biasing means, said pivoting means including an actuator, return spring means for pivoting said pivot members in the opposite direction to disengage said spindle fork means from said spindle yoke, to disengage said drawbar fork means from said drawbar yoke and to cam said gear shafts away from each other against the urging of said biasing means, and means for reversibly rotating said drive gears.

57. A machine tool according to claim 56, further comprising means frictionally holding said drawbar fork means relative to said first pivot member upon disengagement of said drawbar fork means from said drawbar yoke.

58. A machine tool according to claim 56 wherein said pivotal mounting means for said pivot members include a stationary post, a collar for supporting said pivot members surrounding said post and rotatable relative thereto and having a slanted transverse end face, a fixed support salient engaging said end face and adjustable means for securing said collar against rotative movement relative to said post in the desired adjusted angular position therebetween, whereby the level of said pivot members and hence said spindle fork means can be adjusted along the axis of said spindle.

59. A machine tool according to claim 53 wherein said thrust relieving means comprise a fluid operated actuator including a piston operatively connected to said drawbar fork means and having a first end area, and said additional means includes a second end area on said piston.

60. A machine tool according to claim 59 wherein said drawbar pushing means includes a third end area on said piston.

61. A machine tool according to claim 60 wherein said second and third end areas face axially of said piston in a direction opposite from that for said first end area, and means arranged to control the application of pressurized fluid against said first end area to produce said one level of pulling force, against said first and second end areas to produce said lower level of pulling force and against said third end area to produce a pushing force.

62. A machine tool according to claim 61 wherein said control means include four-way three position solenoid valve means operatively associated with said first and third end areas, two-way solenoid valve means operatively associated with said second end area and orifice means operatively associated with said two-way solenoid valve means and said second end area.

63. A machine tool according to claim 53 wherein said nut rotating means includes gear teeth on said nut and drive gear means movable into and out of driving engagement with said nut gear teeth.

64. A machine tool according to claim 63 wherein said drive gear means include a shaft tiltable relative to said longitudinal axis of said drawbar in a plane radial with respect to such axis, a drive gear fast to said shaft adapted to mesh with said nut gear teeth, means constantly biasing the tilt of said shaft in one direction toward meshing said drive gear with said nut gear teeth, cam means for tilting said shaft in the opposite direction and means for reversibly rotating said drive gear.

65. A machine tool according to claim 63 wherein said drive gear means include a pair of gear shafts on opposite sides of said drawbar and tiltable toward and away from each other severally in planes radial with respect to the longitudinal axis of said drawbar, a drive gear fast to each of said gear shafts adapted to mesh with said nut gear teeth, means constantly biasing said gear shafts toward each other, cam means for tilting said gear shafts away from each other and means for reversibly rotating said drive gears including a reversible motor having an output shaft, a drive pulley, slip clutch means operatively interposed between said output shaft and drive pulley, a driven pulley fast to each of said gear shafts and a belt passing around said drive and driven pulleys.

66. In a machine tool having a spindle, the improvement which comprises a tool rack having a plurality of tool stations for storing a plurality of working tools severally adapted for driven connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position, said arm when carrying a working tool carrying only a single working tool and removing a working tool from said spindle and returning it to said rack before said rack is rotated to present another working tool to said arm for pickup thereby and transfer to said spindle, means for axially holding a working tool to said spindle, means for releasing such axial hold on said working tool, and means for indexing said spindle prior to operating said means for releasing said axial hold on said working tool and comprising means providing a pawl recess on said spindle and pawl means including a pawl member having a pawl tooth adapted to enter said pawl recess while said spindle is being rotated to stop said spindle in a predetermined angular position, said pawl recess having a generally radial stop surface, said pawl tooth having a flat stop surface adapted to engage said radial stop surface, said pawl member having a pivot slot elongated in a direction generally perpendicular to said flat stop surface, a fixed pivot pin arranged in said slot and spring means urging said pawl member to move relative to said pivot pin so as to bottom the end of said slot remote from said flat stop surface against said pivot pin and applying a couple to said pawl member urging the same to pivot about said pivot pin in a direction so as to urge said pawl tooth toward said spindle, whereby a cushioned stopping of rotation of said spindle is permitted when said stop surfaces engage by relative sliding movement of said pawl member on said pivot pin to move the latter toward the other end of said slot against the urging of said spring means.

67. A machine tool according to claim 66, further comprising means for indexing said spindle prior to operating said means for releasing said axial hold on said working tool including means providing a pawl recess on said spindle, pawl means including a pawl member having a pawl tooth adapted to enter said pawl recess while said spindle is being rotated to stop said spindle in a predetermined angular position, said spindle being so rotated by said drive gears, and means operatively interposed between one of said pivot members and said pawl member to permit movement of said pawl tooth toward said spindle upon pivotal movement of said pivot members in said one direction and operative to withdraw said pawl tooth from said pawl recess upon pivotal movement of said pivot members in the opposite direction.

68. A machine tool according to claim 67 wherein said operatively interposed means include a cam lug carried by one of said pivot members and a cam surface on said pawl member engageable with said cam lug, and said pawl means further include pivot means for said pawl member and spring means urging said pawl mmeber to pivot in a direction so as to urge said pawl tooth toward said spindle and also to urge said cam surface toward said cam lug.

69. In a machine tool having a spindle, the improvement which comprises a tool rack having a plurality of tool stations for storing a plurality of working tools severally adapted for drive connection to said spindle, means mounting said rack for rotation about a fixed axis generally parallel to that of said spindle and radially spaced therefrom, a transfer arm pivotable about an axis radially spaced from but generally parallel to the rack and spindle axes between a first angular position adjacent said rack and a second angular position adjacent said spindle, means mounting said arm for such pivotal movement only between said angular positions as limits without stopping in moving from one to the other of said angular positions, means mounting said arm for translation axially of said axes only between a first axial position axially adjacent said rack and spindle and a second axial position axially remote from said rack and spindle as limits without stopping in moving from one to the other of said axial positions, a working tool grasper arranged on said arm for extension and retraction relative thereto and arranged to exert a prehensile grip only when said arm is in said second axial position but not when in said first axial position said arm when carrying a working tool carrying only a single working tool and removing a working tool from said spindle and returning it to said rack before said rack is rotated to present another working tool to said arm for pickup thereby and transfer to said spindle, a drive shaft for said spindle, means for indexing said spindle, and means including centrifugal means responsive to the rotational decelerating speed of said shaft for preventing operation of said spindle indexing means until such speed falls to a predetermined level.

70. A machine tool according to claim 69, further comprising a gear shifter assembly in the drive for said spindle shiftable into a neutral condition and having a control shaft rotatable to shift said assembly, sand means for rotating said shaft to shift said assembly into said neutral condition before said indexing means is operated.

* * * * *

UNITED STATES PATENT OFFICE
CERTIFICATE OF CORRECTION

Patent No. 3,844,028                    Dated   October 29, 1974

Inventor(s)    Robert Z. Hague et al.

It is certified that error appears in the above-identified patent and that said Letters Patent are hereby corrected as shown below:

Col. 13, line 10:   "upper wall" should be -- upper end wall --;

Col. 18, line 43:   "drive member" should be -- driven member --;

Col. 21, line 16:   "screws 347" should be -- screws 374' --;

Col. 22, line 39:   "finger member 376" should be -- finger member 375 --;

, line 41:   "pivot 375" should be -- pivot 376 --;

Claim 44, penultimate line:   "an" should be -- a --;

Claim 68, line 7:   "mmeber" should be -- member --;

Claim 69, line 4:   "drive connection" should be -- driven connection --;

Claim 70, line 4:   "sand" should be -- and --.

Signed and sealed this 24th day of June 1975.

(SEAL)
Attest:

RUTH C. MASON
Attesting Officer

C. MARSHALL DANN
Commissioner of Patents
and Trademarks